(12) United States Patent
Akita et al.

(10) Patent No.: US 9,350,849 B2
(45) Date of Patent: May 24, 2016

(54) COMMUNICATION APPARATUS, PROCESSING METHOD AND COMPUTER-READABLE RECORDING MEDIUM

(71) Applicant: KABUSHIKI KAISHA TOSHIBA, Minato-ku, Tokyo (JP)

(72) Inventors: Koji Akita, Yokohama Kanagawa (JP); Hiroyasu Uchida, Tokyo (JP); Takayoshi Ito, Yokohama Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/467,867

(22) Filed: Aug. 25, 2014

(65) Prior Publication Data

US 2015/0065042 A1 Mar. 5, 2015

(30) Foreign Application Priority Data

Sep. 3, 2013 (JP) ................. 2013-181908

(51) Int. Cl.
*H04M 1/725* (2006.01)
*H04W 4/00* (2009.01)
*H04W 4/02* (2009.01)

(52) U.S. Cl.
CPC ............ *H04M 1/7253* (2013.01); *H04W 4/008* (2013.01); *H04W 4/023* (2013.01); *H04M 2250/04* (2013.01)

(58) Field of Classification Search
CPC H04M 1/7253; H04M 2250/04; H04W 4/008
USPC ........... 455/41.1, 41.2, 434, 566, 550.1, 41.3, 455/574, 565, 73, 419; 343/702, 725, 749, 343/895, 729, 750, 751, 860; 358/1.15; 340/10.1, 5.1, 5.51, 5.65; 235/492; 370/338, 466

See application file for complete search history.

(56) References Cited

U.S. PATENT DOCUMENTS

| | | | | |
|---|---|---|---|---|
| 6,211,830 B1 * | 4/2001 | Monma | .................. | H01Q 1/242 343/702 |
| 7,792,490 B2 * | 9/2010 | Annola | ................. | H04W 76/02 455/41.1 |
| 2005/0141036 A1 * | 6/2005 | Kakutani | ............. | H04N 1/4074 358/3.05 |
| 2005/0164634 A1 * | 7/2005 | Tanaka | ................ | H04L 63/0492 455/41.2 |
| 2007/0149124 A1 * | 6/2007 | Onozawa | ............. | H04B 5/0062 455/41.2 |

(Continued)

FOREIGN PATENT DOCUMENTS

| | | |
|---|---|---|
| JP | 2006-166311 A | 6/2006 |
| JP | 2007-115067 A | 10/2007 |
| JP | 2011-186781 A | 9/2011 |

*Primary Examiner* — Tan H Trinh
(74) *Attorney, Agent, or Firm* — Ohlandt, Greeley, Ruggiero & Perle, L.L.P.

(57) ABSTRACT

According to one embodiment, a communication apparatus includes a communication unit that establishes at least one proximity wireless connection with a communication partner apparatus. The communication apparatus includes a connection monitoring unit that monitors the communication unit and detect establishment of the wireless connection. The communication apparatus includes an execution control unit that identifies an establishment history of a plurality of the wireless connections based on a result of monitoring by the connection monitoring unit and, based on the establishment history, controls a process execution unit that executes at least one process.

18 Claims, 16 Drawing Sheets

(56) References Cited

U.S. PATENT DOCUMENTS

| | | | | |
|---|---|---|---|---|
| 2009/0102740 A1* | 4/2009 | Rofougaran | H01L 23/66 343/860 |
| 2009/0305742 A1* | 12/2009 | Caballero | H04B 1/3838 455/566 |
| 2010/0260146 A1* | 10/2010 | Lu | H04L 12/4633 370/331 |
| 2010/0297939 A1* | 11/2010 | Fujita | H04W 4/00 455/41.1 |
| 2011/0070825 A1* | 3/2011 | Griffin | H04B 5/0031 455/41.1 |
| 2011/0070827 A1* | 3/2011 | Griffin | H04B 5/02 455/41.1 |
| 2011/0070828 A1* | 3/2011 | Griffin | H04M 1/7253 455/41.1 |
| 2011/0070834 A1* | 3/2011 | Griffin | G06K 7/10237 455/41.1 |
| 2011/0070837 A1* | 3/2011 | Griffin | H04B 5/0062 455/41.3 |
| 2011/0275316 A1* | 11/2011 | Suumaki | G06K 7/10237 455/41.1 |
| 2012/0019674 A1* | 1/2012 | Ohnishi | G08C 17/00 348/207.1 |
| 2012/0099566 A1* | 4/2012 | Laine | H04M 1/7253 370/338 |
| 2012/0135687 A1* | 5/2012 | Thorn | H04M 1/7253 455/41.2 |
| 2013/0122805 A1* | 5/2013 | Hirose | H04B 5/0031 455/41.1 |
| 2013/0124737 A1* | 5/2013 | Tachibana | H04L 12/00 709/227 |
| 2013/0188523 A1* | 7/2013 | Goto | H04W 28/24 370/255 |
| 2013/0247117 A1* | 9/2013 | Yamada | G08C 17/02 725/93 |
| 2013/0303085 A1* | 11/2013 | Boucher | H04W 12/06 455/41.1 |
| 2013/0314214 A1* | 11/2013 | Leica | H04B 5/0056 340/10.1 |
| 2013/0344804 A1* | 12/2013 | Chen | H04B 5/02 455/41.1 |
| 2014/0176991 A1* | 6/2014 | Yun | G06F 3/1292 358/1.15 |
| 2014/0256248 A1* | 9/2014 | Cargill | H04B 5/005 455/41.1 |
| 2015/0044970 A1* | 2/2015 | Park | H04M 1/7253 455/41.2 |
| 2015/0120000 A1* | 4/2015 | Coffey | H04L 12/2803 700/13 |
| 2015/0163621 A1* | 6/2015 | Wang | H04W 4/008 455/41.3 |
| 2015/0208194 A1* | 7/2015 | Ito | G06F 21/10 455/41.2 |
| 2015/0230283 A1* | 8/2015 | Li | H04B 5/0031 455/41.1 |

\* cited by examiner

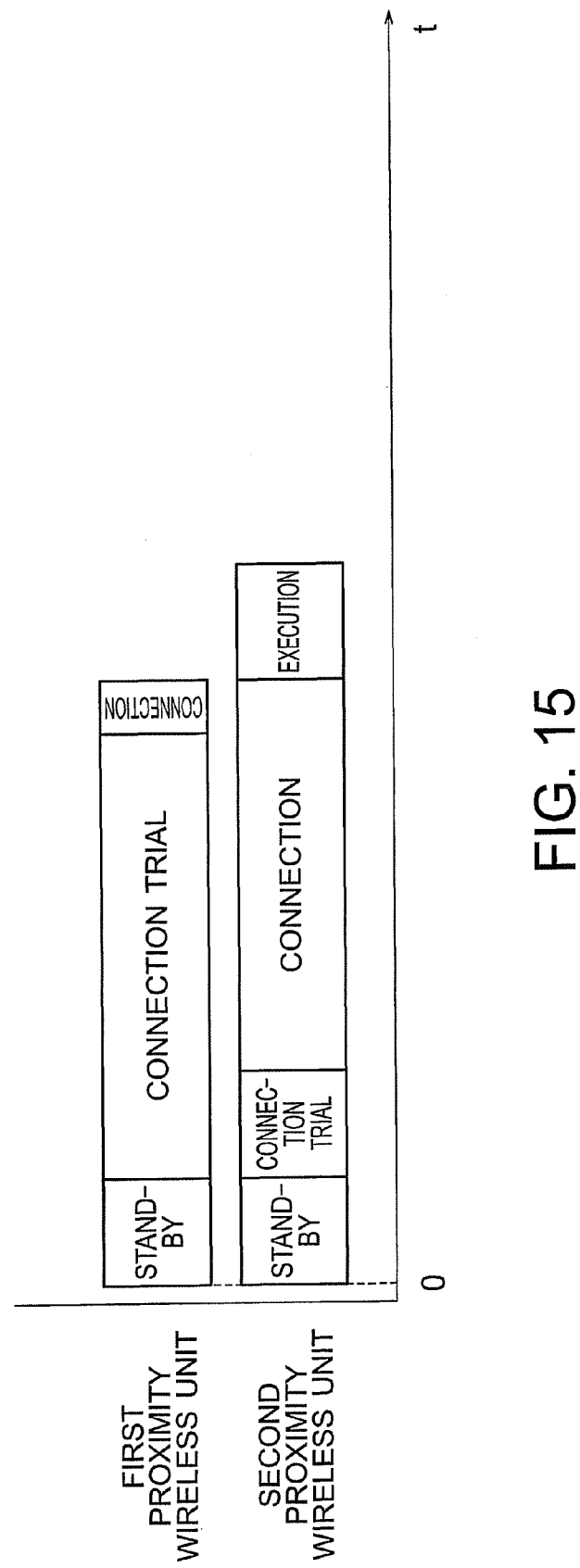

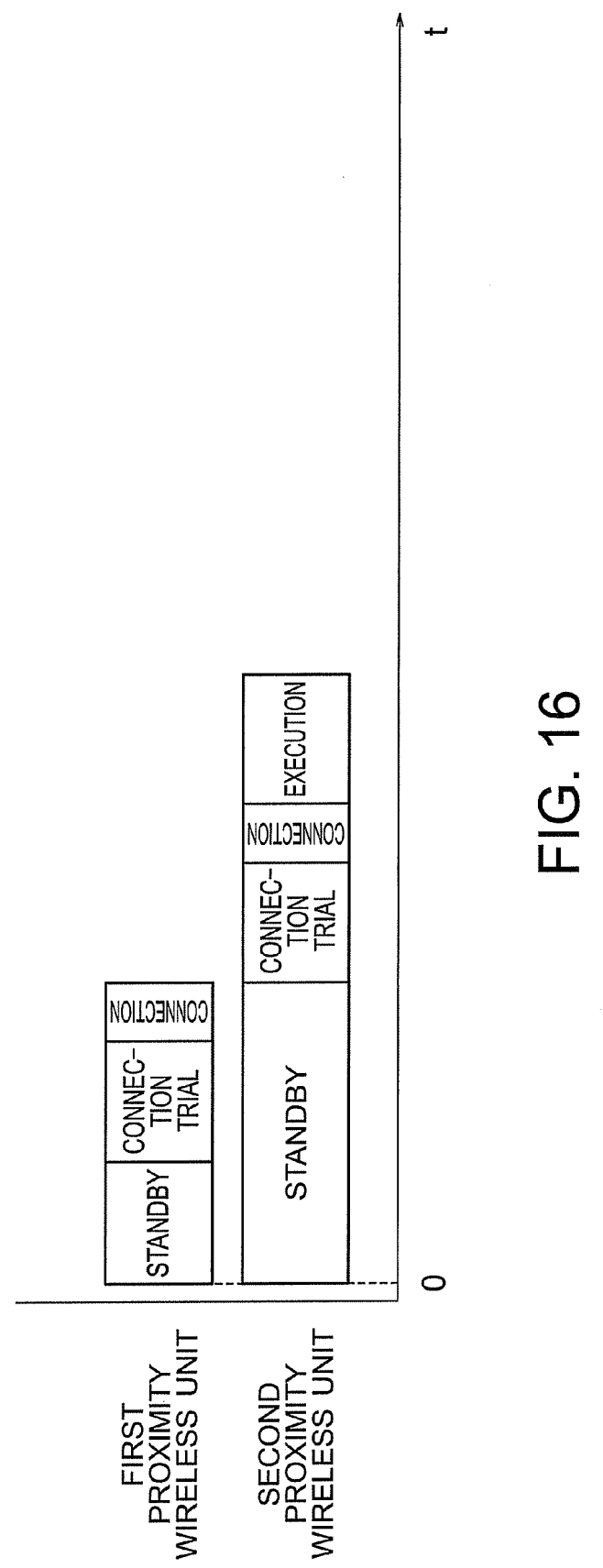

COMMUNICATION APPARATUS, PROCESSING METHOD AND COMPUTER-READABLE RECORDING MEDIUM

CROSS-REFERENCE TO RELATED APPLICATIONS

This application is based upon and claims the benefit of priority from Japanese Patent Application No. 2013-181908, filed Sep. 3, 2013; the entire contents of which are incorporated herein by reference.

FIELD

Embodiments described herein relate generally to a communication apparatus, a processing method and a computer-readable recording medium.

BACKGROUND

There are known apparatuses which provide services using wireless communication in a distance as short as about several to 10 cm, as used in Felica, Suica, and Near Field Communication (NFC). These IC cards are generally adapted to automatically execute services upon start of communication. For example, if a Suica card is held over a reader writer for payment, a payment service is automatically executed.

However, these IC cards are sometimes put in a communication enabled state although users of the IC cards have no intention for communication. This causes a problem that the IC cards and the reader writer perform communication to execute some processes despite the intension of the users.

BRIEF DESCRIPTION OF THE DRAWINGS

FIG. 15 illustrates a first example of time variations in communication states of the first proximity wireless unit 231 and the second proximity wireless unit 232 in the fourth embodiment.

FIG. 16 illustrates a second example of time variations in communication states of the first proximity wireless unit 231 and the second proximity wireless unit 232 in the fourth embodiment.

DETAILED DESCRIPTION

According to one embodiment, a communication apparatus includes a communication unit that establishes at least one proximity wireless connection with a communication partner apparatus. The communication apparatus includes a connection monitoring unit that monitors the communication unit and detect establishment of the wireless connection. The communication apparatus includes an execution control unit that identifies an establishment history of a plurality of the wireless connections based on a result of monitoring by the connection monitoring unit and, based on the establishment history, controls a process execution unit that executes at least one process.

Hereinbelow, embodiments of the present invention will be described in detail with reference to the drawings.

<First Embodiment>

Figure 1:
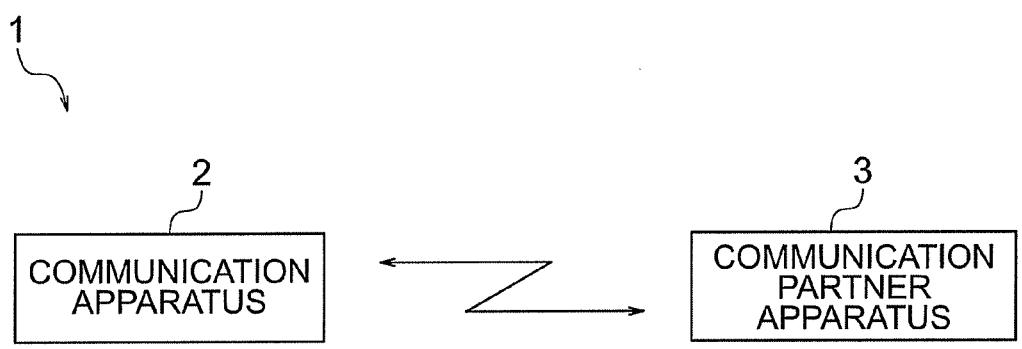
FIG. 1 is a schematic block diagram illustrating the configuration of a communication system 1 in a first embodiment.

FIG. 1 is a schematic block diagram illustrating the configuration of a communication system 1 in a first embodiment. The communication system 1 includes a communication apparatus 2 and a communication partner apparatus 3.

The communication apparatus 2 makes proximity wireless communication with the communication partner apparatus 3.

The proximity wireless communication is wireless communication executed in a distance of about 0 to tens of centimeters. Examples of the communication apparatus 2 may include card-like apparatuses, mobile phones, smartphones, tablet terminals, or personal computers.

Figure 2:
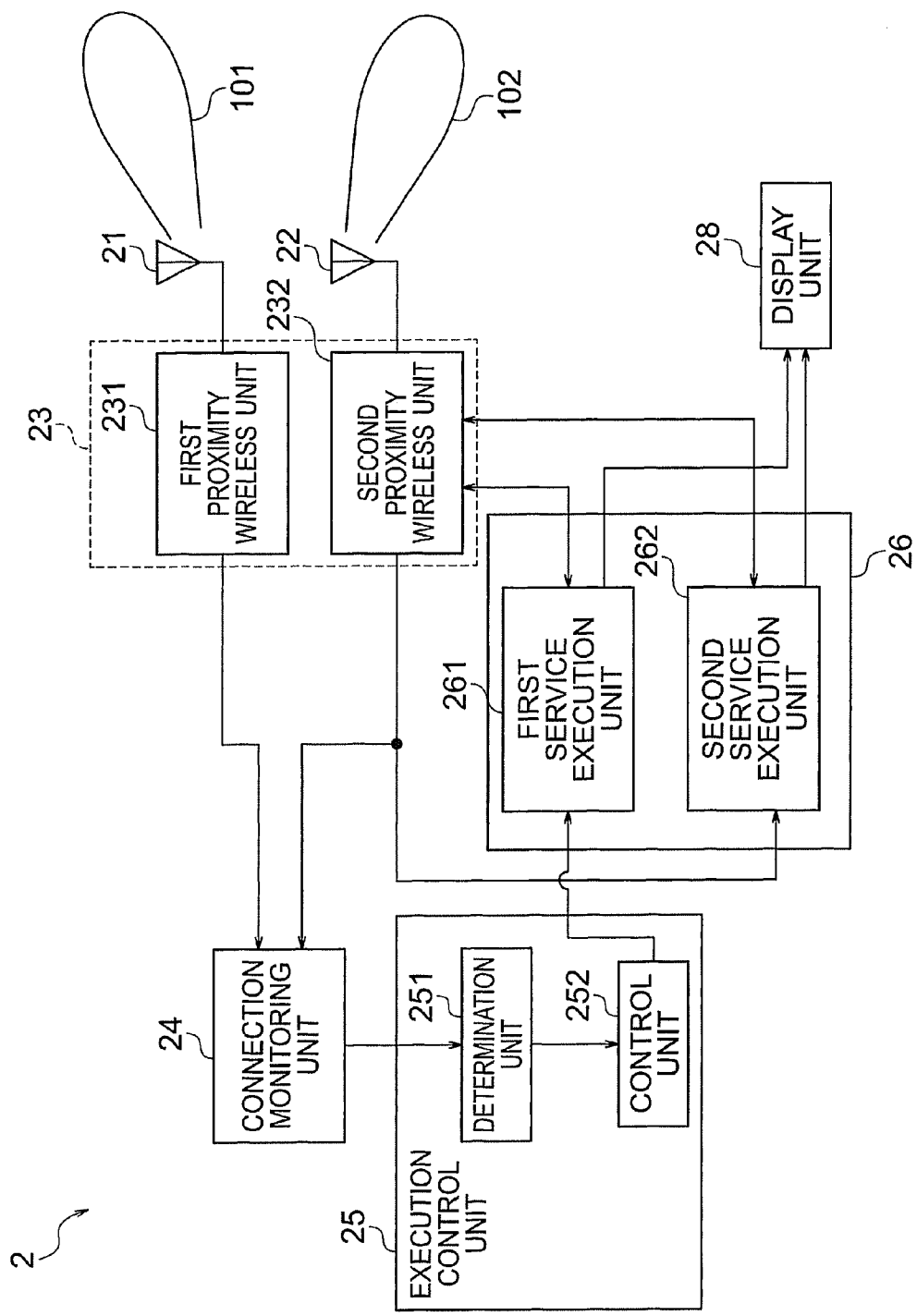
FIG. 2 is a schematic block diagram illustrating the configuration of the communication apparatus 2 in the first embodiment.

FIG. 2 is a schematic block diagram illustrating the configuration of the communication apparatus 2 in the first embodiment. The communication apparatus 2 includes a first antenna 21, a second antenna 22, and a communication unit 23 connected to the first antenna 21 and the second antenna 22. The communication apparatus 2 further includes a connection monitoring unit 24 connected to the communication unit 23, an execution control unit 25 connected to the connection monitoring unit 24, a process execution unit 26 connected to the execution control unit 25, and a display unit 28 connected to the process execution unit 26.

Here, the communication unit 23 includes a first proximity wireless unit (first wireless unit) 231 which is connected to the first antenna 21 and which has an output connected to the connection monitoring unit 24, and a second proximity wireless unit (second wireless unit) 232 which is connected to the second antenna 22 and which has a first output connected to the connection monitoring unit 24 and to a later-described second service execution unit 262 of the process execution unit 26.

The execution control unit 25 includes a determination unit 251 having an input connected to the connection monitoring unit 24, and a control unit 252 having an input connected to an output of the determination unit 251.

The process execution unit 26 includes a first service execution unit 261 having a first input connected to an output of the control unit 252, a first input/output connected to a first input/output of the second proximity wireless unit 232, and a first output connected to the display unit 28. The process execution unit 26 further includes the second service execution unit 262 having a first input connected to a first output of the second proximity wireless unit 232, a first input/output connected to a second input/output of the second proximity wireless unit 232, and a first output connected to the display unit 28.

The first antenna 21 is connected to the first proximity wireless unit 231. The first antenna 21 receives a transmission signal from the first proximity wireless unit 231, and wirelessly transmits the received transmission signal to the communication partner apparatus 3. The first antenna 21 also receives a signal wirelessly transmitted by the communication partner apparatus 3 and outputs the received signal to the first proximity wireless unit 231. The first antenna 21 has a directivity different from that of the second antenna 22. In one example, the first antenna 21 has a first directivity 101 illustrated in FIG. 4. The directivity herein refers to a relation between a radiation direction and a radiation intensity of a radio wave.

Figure 4:
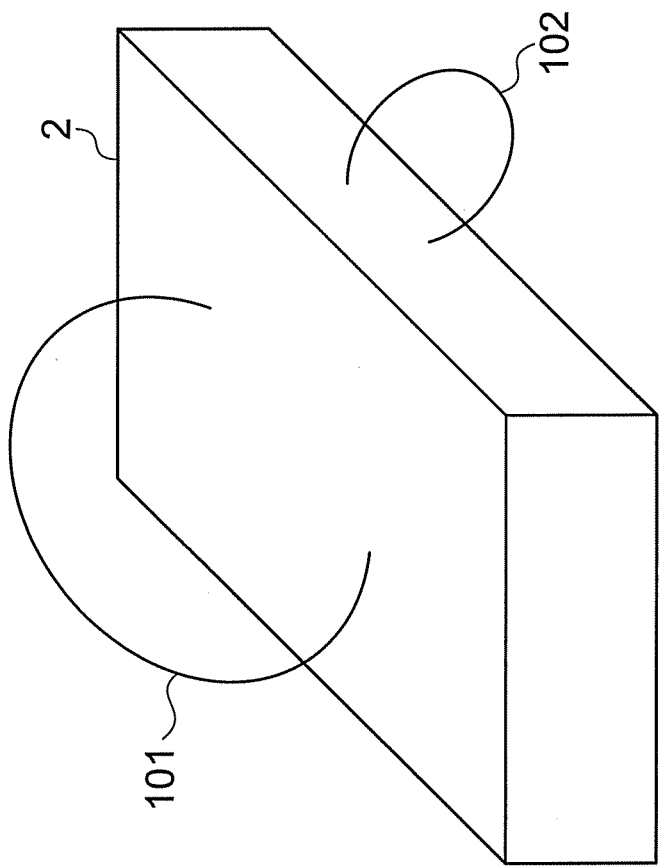
FIG. 4 illustrates one example of directivities of the first antenna 21 and the second antenna 22 included in the communication apparatus 2 in the first embodiment.

The second antenna 22 is connected to the second proximity wireless unit 232. The second antenna 22 receives a transmission signal from the second proximity wireless unit 232, and wirelessly transmits the received transmission signal to the communication partner apparatus 3. The second antenna 22 also receives a signal wirelessly transmitted by the communication partner apparatus 3 and outputs the received signal to the second proximity wireless unit 232. The second antenna 22 has a directivity different from that of the first antenna 21. In one example, the second antenna 22 has a second directivity 102 illustrated in FIG. 4. In the example of FIG. 4, the directivities of the first antenna 21 and the second antenna 22 are in directions of different surfaces of a casing that houses the communication apparatus 2.

The communication unit 23 can establish at least one proximity wireless connection with the communication partner apparatus. The communication unit 23 executes proximity communication with the communication partner apparatus after establishment of the wireless connection.

The first proximity wireless unit 231 establishes one wireless connection among a plurality of wireless connections established by the communication unit 23, via the first antenna 21. The first proximity wireless unit 231 wirelessly transmits a transmission signal to the communication partner apparatus 3 via the first antenna 21. The first proximity wireless unit 231 receives a signal wirelessly transmitted by the communication partner apparatus 3 via the first antenna 21.

The second proximity wireless unit 232 establishes another wireless connection among the plurality of wireless connections established by the communication unit 23, via the second antenna 22. The second proximity wireless unit 232 wirelessly transmits a transmission signal to the communication partner apparatus 3 via the second antenna 22. The second proximity wireless unit 232 receives a signal wirelessly transmitted by the communication partner apparatus 3 via the second antenna 22.

The connection monitoring unit 24 monitors the communication unit 23 and detect establishment of a wireless connection. More specifically, the connection monitoring unit 24 monitors, for example, connections of the first proximity wireless unit 231 and the second proximity wireless unit 232 and detect a time when the first proximity wireless unit 231 establishes the connection with the communication partner apparatus 3, and a time when the second proximity wireless unit 232 establishes the connection with the communication partner apparatus 3. The connection monitoring unit 24 then generates connection state information including information identifying the connected wireless unit and information on the connection time, and outputs the generated connection state information to the determination unit 251. The connection monitoring unit 24 may generate the connection state information whenever the connection state is changed, or may notify the determination unit 251 of the connection state information whenever the information is generated.

The execution control unit 25 identifies an establishment history of the plurality of wireless connections based on the monitored result of the connection monitoring unit 24. Based on the establishment history, the execution control unit 25 controls the process execution unit 26 that executes at least one process. More specifically, the execution control unit 25 controls the process execution unit 26 in accordance with an order of wireless connection establishment identified from this establishment history. In that case, the execution control unit 25 controls the process execution unit 26 in accordance with whether the order of wireless connection establishment identified from the establishment history matches a predetermined connection establishment pattern. Here, the connection establishment pattern includes an order of successive establishment of the wireless connections which are different from each other.

For example, the determination unit 251 determines whether or not to execute the predetermined process based on the establishment history. More specifically, the determination unit 251 determines whether or not to execute the predetermined process in accordance with, for example, whether the order of wireless connection establishment identified from the establishment history matches the predetermined connection establishment pattern.

In the present embodiment, the determination unit 251 determines, based on the result of monitoring by the connection monitoring unit 24, whether or not the communication unit 23 has established a second wireless connection with the communication partner apparatus 3 in a specified time after the communication unit 23 established a first wireless connection with the communication partner apparatus 3 in one example. In a specific example, the determination unit 251 performs the determination based on the connection state information inputted from the connection monitoring unit 24.

In one example, the first wireless connection and the second wireless connection are different in a connection mode in wireless connection (for example, an antenna directivity, an antenna polarization, a communication distance, a time from the start of a wireless connection to completion of establishment of the wireless connection, etc.). In the present embodiment, the first wireless connection and the second wireless connection are different in the antenna directivity in one example. Specifically, the first wireless connection uses the first antenna 21, and the second wireless connection uses the second antenna 22. The determination unit 251 outputs these determination results to the control unit 252.

The control unit 252 controls execution of the predetermined process in the process execution unit 26 in accordance with the determination result of the determination unit 251. For example, when the determination unit 251 determines that the communication unit 23 has established a second wireless connection with the communication partner apparatus 3 in a specified time after the communication unit 23 established a first wireless connection with the communication partner apparatus 3, the control unit 252 controls the first service execution unit 261 so as to execute the predetermined process. On the contrary, when the determination unit 251 determines that the communication unit 23 has not established the second wireless connection with the communication partner apparatus 3 in a specified time after the communication unit 23 established the first wireless connection with the communication partner apparatus 3, the control unit 252 controls the first service execution unit 261 so as not to execute the predetermined process. Here, the predetermined process is, for example, a process using communication through the first wireless connection or the second wireless connection.

The process execution unit 26 executes at least one process. Here, the process executed by the process execution unit 26 is, for example, a process using wireless communication made by the communication unit 23 which established the wireless connection.

The first service execution unit 261 executes a first service under the control of the control unit 252. The first service is, for example, a service (such as a settlement service) executed when the second proximity wireless unit 232 performs wireless communication with the communication partner apparatus 3. The first service execution unit 261 displays, for example, an execution result of the first service on the display unit 28.

The second service execution unit 262 executes a second service different from the first service when the connection of wireless communication with the communication partner apparatus 3 has been established in the second proximity wireless unit 232. For example, when the connection of wireless communication with the communication partner apparatus 3 has been established in the second proximity wireless unit 232, the second service execution unit 262 receives a signal notifying establishment of the connection from the second proximity wireless unit 232. Then, for example, the second service execution unit 262 executes a second service using the wireless communication in the second proximity wireless unit 232. At that time, the second service execution unit 262 displays, for example, an execution result of the second service on the display unit 28.

Figure 3:
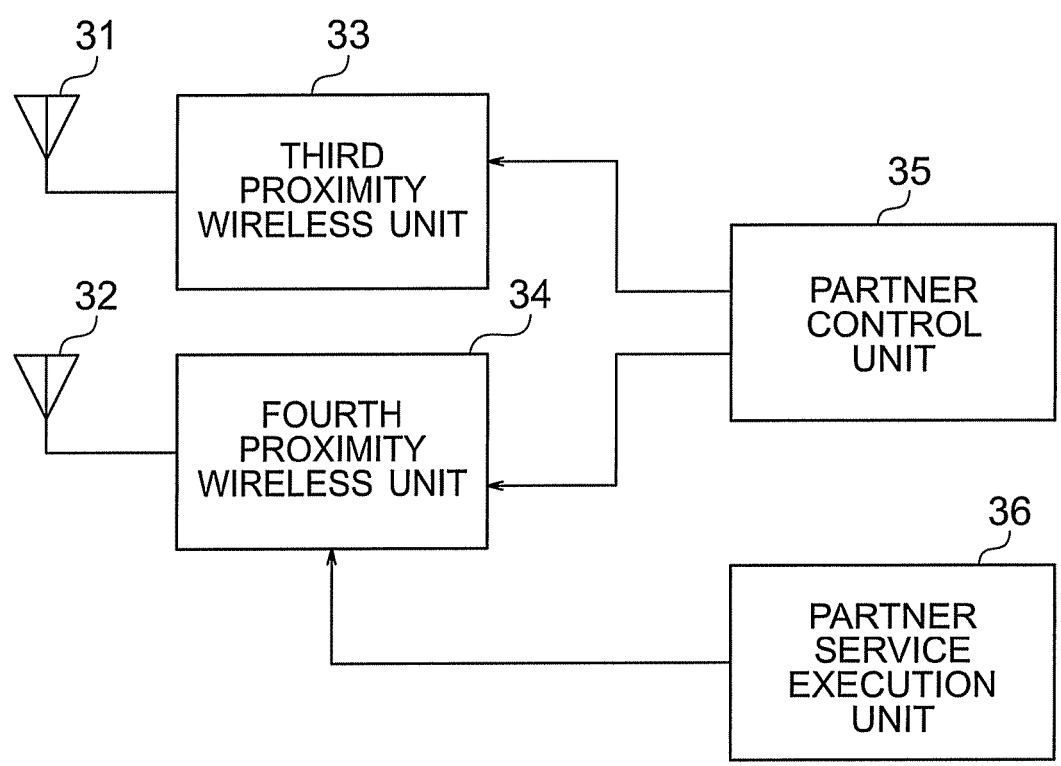
FIG. 3 is a schematic block diagram illustrating the configuration of the communication partner apparatus 3 in the first embodiment.

FIG. 3 is a schematic block diagram illustrating the configuration of the communication partner apparatus 3 in the first embodiment. The communication partner apparatus 3 includes a third antenna 31, a fourth antenna 32, a third proximity wireless unit 33 connected to the third antenna 31, a fourth proximity wireless unit 34 connected to the fourth antenna 32, a partner control unit 35 connected to the third proximity control unit 33 and the fourth proximity wireless unit 34, and a partner service execution unit 36 connected to the fourth proximity wireless unit 34.

The third proximity wireless unit 33 performs proximity wireless communication with the first proximity wireless unit 231 of the communication apparatus 2 via the third antenna 31.

The fourth proximity wireless unit 34 performs proximity wireless communication with the second proximity wireless unit 232 of the communication apparatus 2 via the fourth antenna 32.

The partner control unit 35 controls the third proximity wireless unit 33 and the fourth proximity wireless unit 34.

The partner service execution unit 36 executes a first service using the fourth proximity wireless unit 34. More specifically, the partner service execution unit 36 executes, for example, a first service (for example, a settlement service) using the fourth proximity wireless unit 34, when the fourth proximity wireless unit 34 has established wireless communication with the second proximity wireless unit 232 of the communication apparatus 2.

FIG. 4 illustrates one example of directivities of the first antenna 21 and the second antenna 22 included in the communication apparatus 2 in the first embodiment. The first directivity 101 of the first antenna 21 and the second directivity 102 of the second antenna 22 are illustrated. The first directivity 101 is in a direction vertical to a principal surface of the communication apparatus 2. Here, the principal surface is orthogonal to a "z" axis and is on a positive side of the "z" axis. The second directivity 102 is in a direction vertical to a first lateral surface of the communication apparatus 2. Here, the first lateral surface is orthogonal to a "y" axis and is on a positive side of the "y" axis.

When the communication apparatuses including two wireless units come close to each other, either each one unit or both the units may generally be in a communication enabled state. In the communication apparatus 2 of the present embodiment, the first directivity 101 and the second directivity 102 are provided in different directions as illustrated in FIG. 4 in one example. Such configuration makes it possible to reduce a probability that the first antenna 21 and the second antenna 22 are simultaneously in the communication enabled state.

Furthermore, the control unit 252 in the present embodiment controls so that the first service is executed in the first service execution unit 261 only in the case where the second wireless connection is established in the second proximity wireless unit 232 in a specified time after establishment of the first wireless connection in the first proximity wireless unit 231. Accordingly, the first service is executed only in the case where the first wireless connection in the first proximity wireless unit 231 and the second wireless connection in the second proximity wireless unit 232 are executed in order in a specified time.

Figure 5:
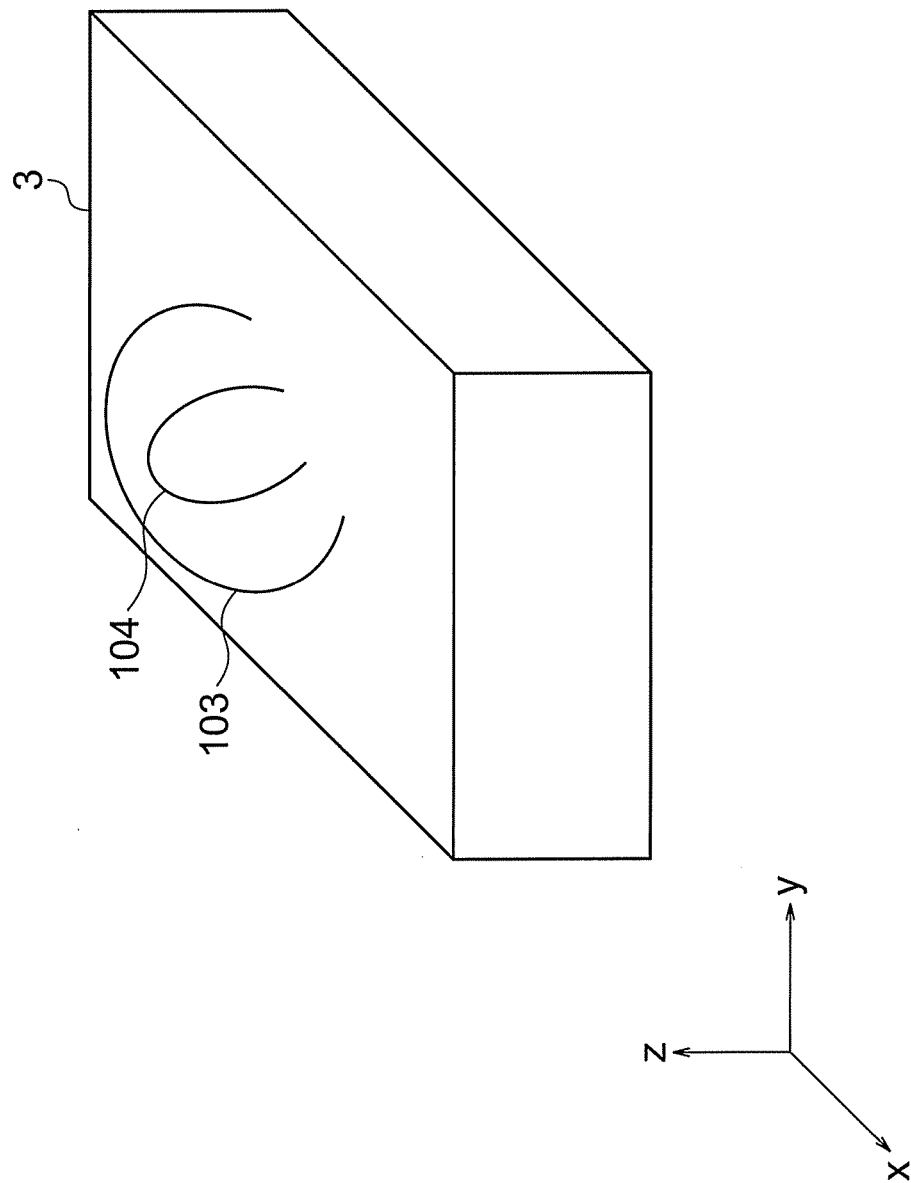
FIG. 5 illustrates one example of directivities of the third antenna 31 and the fourth antenna 32 included in the communication partner apparatus 3 in the first embodiment.

FIG. 5 illustrates one example of directivities of the third antenna 31 and the fourth antenna 32 included in the communication partner apparatus 3 in the first embodiment. A third directivity 103 of the third antenna 31 and a fourth directivity 104 of the fourth antenna 32 are illustrated. The third directivity 103 is in a direction vertical to a principal surface of the communication partner apparatus 3. Here, the principal surface is orthogonal to the "z" axis and is on a positive side of the "z" axis. While the fourth directivity 104 is also in a direction vertical to the principal surface of the communication partner apparatus 3, a width thereof is narrower than that of the third directivity 103.

Figure 6:
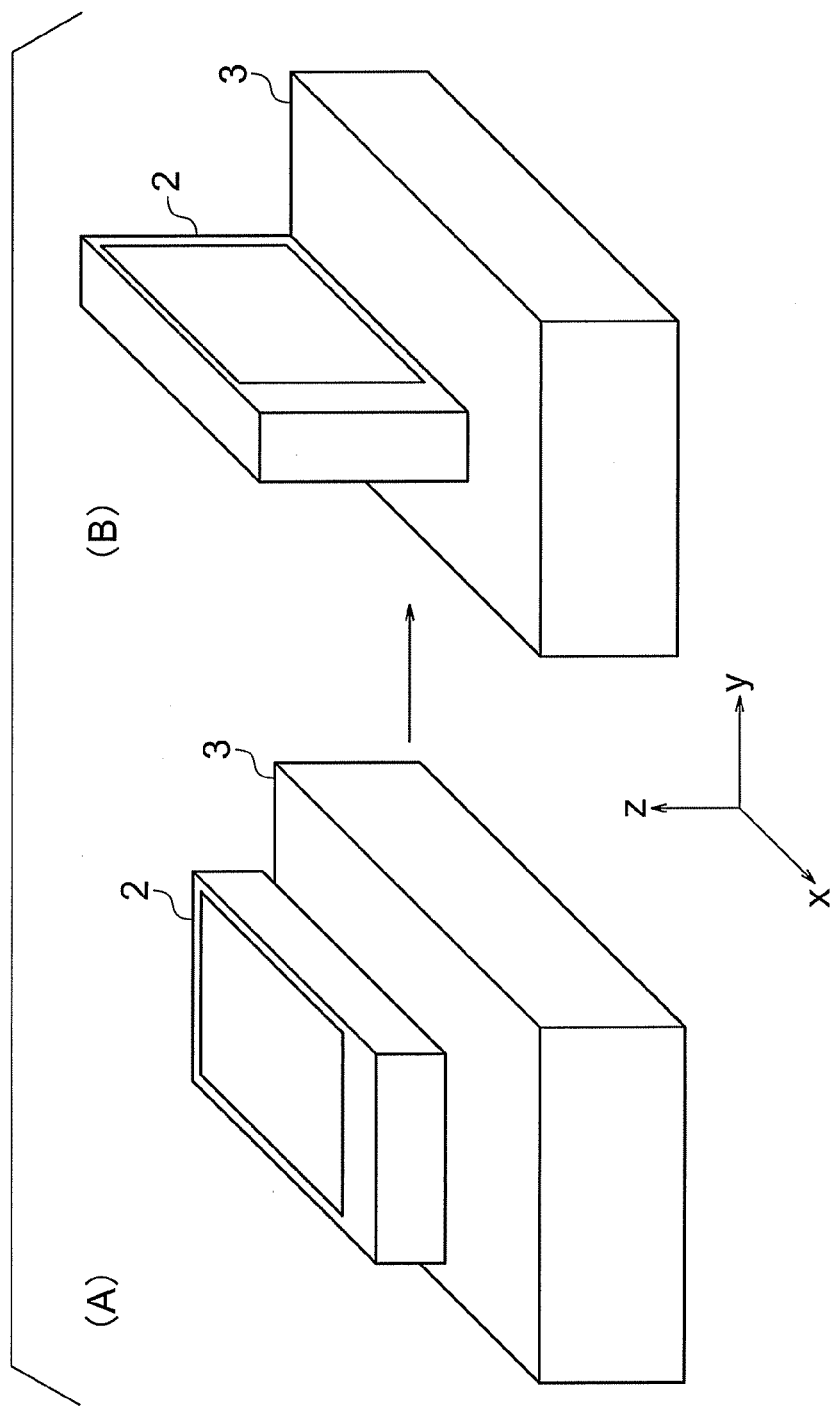
FIG. 6(A) illustrates one example of a positional relationship between the communication apparatus 2 and the communication partner apparatus 3 when the first wireless connection is established in the first embodiment.
FIG. 6(B) illustrates one example of the positional relationship between the communication apparatus 2 and the communication partner apparatus 3 when the second wireless connection is established in the first embodiment.

FIG. 6(A) illustrates one example of a positional relationship between the communication apparatus 2 and the communication partner apparatus 3 when the first wireless connection is established in the first embodiment. FIG. 6(B) illustrates one example of the positional relationship between the communication apparatus 2 and the communication partner apparatus 3 when the second wireless connection is established in the first embodiment.

For example, assume the case where the first directivity 101 and the second directivity 102 are as illustrated in FIG. 4, and the directivity 103 of the third antenna 31 and the directivity 104 of the fourth antenna 32 in the communication partner apparatus 3 are as illustrated in FIG. 5. In this case, the first service is executed when the communication apparatus 2 and the communication partner apparatus 3 come close to each other so as to have the positional relationship as illustrated in FIG. 6(A) and then, within a specified time, the communication apparatus 2 and the communication partner apparatus 3 come close to each other so as to have the positional relationship as illustrated FIG. 6(B).

Thus, the first directivity 101 and the second directivity 102 are configured to be in different directions. Accordingly, the user needs to change the posture of the communication apparatus 2 in order to execute the first service. Since such change in posture is not usually performed without the intention of the user, it becomes possible to reduce a probability of occurrence of a situation where the first wireless connection is established in the first proximity wireless unit 231 and then, within a specified time, the second wireless connection is established in the second proximity wireless unit 232 without the intention of the user. Thus, a probability of the service being executed without the intention of the user although the user holds the communication apparatus 2 can be reduced.

If the communication apparatus 2 establishes a first wireless connection with the first proximity wireless unit 231 of one communication partner apparatus 3 and then, within a specified time, makes a second wireless connection with the second proximity wireless unit 232 of another communication partner apparatus 3, there is theoretically a possibility that the communication apparatus 2 executes the first service. In this case, in order to establish this second wireless connection, the user needs to change the posture of the communication apparatus 2. However, the possibility of the user making such a posture change and then bringing the apparatus close to the another communication partner apparatus 3 by mistake is extremely low.

Therefore, even in the case where, for example, the plurality of communication partner apparatuses 3 illustrated in FIG. 5 are placed in a specified range (for example, adjacent to each other), it becomes possible to reduce a probability that the first service is accidentally executed when, in a specified time after establishment of a first wireless connection with the first proximity wireless unit 231 of one communication partner apparatus 3, a second wireless connection with the second proximity wireless unit 232 of another communication partner apparatus 3 is accidentally made. Furthermore, as the specified time is set to be a shorter time, a probability of occurrence of such a problem can be made lower. Thus, when the plurality of the communication partner apparatuses 3 are placed adjacent to each other, a probability of the communication apparatus 2 executing a service with partners other than the desired communication partner apparatus 3 can be reduced.

<Example of Proximity Wireless Scheme>

The communication unit 23 may adopt a wireless scheme using a coupler for the proximity wireless communication. In the wireless scheme using a coupler, the directivity is in a direction vertical to the surface where the coupler is positioned. Thus, since the directivity can be set in a certain direction, it becomes easy to set the first directivity and the second directivity in different directions. This achieves an effect of facilitating efficient implementation of the effect of the present embodiment. Examples of the communication scheme using a coupler may include NFC, Felica, and TransferJet.

The communication unit 23 may adopt a wireless scheme using a millimeter wave for the proximity wireless communication. Since the millimeter wave has a short wavelength, the wireless scheme using the millimeter wave has a characteristics that the directivity can be narrowed so that a radio wave is easily directed in a specific direction even in the case of small apparatuses. As a result, the first directivity and the second directivity can easily be set in different directions, which makes it possible to achieve an effect of being able to implement the effect of the present embodiment.

The first proximity wireless unit 231 and the second proximity wireless unit 232 may use the same wireless scheme, or may use different wireless schemes.

For example, the first proximity wireless unit 231 may perform electric power transmission.

<Directivity>

Difference in directivity refers to difference in direction of a main directivity between antennas as illustrated in FIG. 4 for example. Or the difference in directivity refers to difference between antennas at least in a part of a wireless communication enabled region. Because of these characteristics, it becomes possible to reduce the probability of occurrence of a situation where both the first proximity wireless unit 231 and the second proximity wireless unit 232 are put in a communication enabled state when the communication apparatuses are brought close to each other in a certain posture.

<Installation of Antennas on Different Surfaces>

In one example, the communication apparatus 2 in the present embodiment has a rectangular parallelepiped shape. In one example, as illustrated in FIG. 4, the directivity of the first antenna 21 and the directivity of the second antenna 22 are set in normal line directions extending from different surfaces of the rectangular parallelepiped.

In this configuration, the directivities can be set in different directions and a user who uses the communication apparatus 2 can easily recognize the directions of the respective directivities. For example, assume the case where the first directivity 101 and the second directivity 102 are set as illustrate in FIG. 4. In this case, the user of the communication apparatus 2 can easily recognize that a first wireless connection can be made in the first proximity wireless unit by bringing the apparatuses close to each other as in FIG. 6(A) and that a second wireless connection can be made in the second proximity wireless unit 232 by bringing the apparatuses close to each other as in FIG. 6(B).

When the first proximity wireless unit 231 and the second proximity wireless unit 232 use different frequencies in wireless communication, a larger surface may be configured to have the directivity for a lower frequency for example. Generally, a wireless unit including an antenna and a coupler tends to be upsized with a lower frequency. Accordingly, efficient wireless communication can be implemented by placing the wireless unit using a lower frequency on a larger surface. For example, the first proximity wireless unit 231 may be used for NFC or Felica, while the second proximity wireless unit 232 may be used for TransferJet and/or millimeter wave communication. The first proximity wireless unit 231 may be installed on the principal surface of the communication apparatus 2 in FIG. 4 so as to obtain the first directivity 101 of FIG. 4.

The second proximity wireless unit 232 may be installed on the first lateral surface of the communication apparatus 2 in FIG. 4 so as to obtain the second directivity 102 of FIG. 4.

Now, operation procedures of the first embodiment are described with reference to FIGS. 7 to 9.

Figure 7:
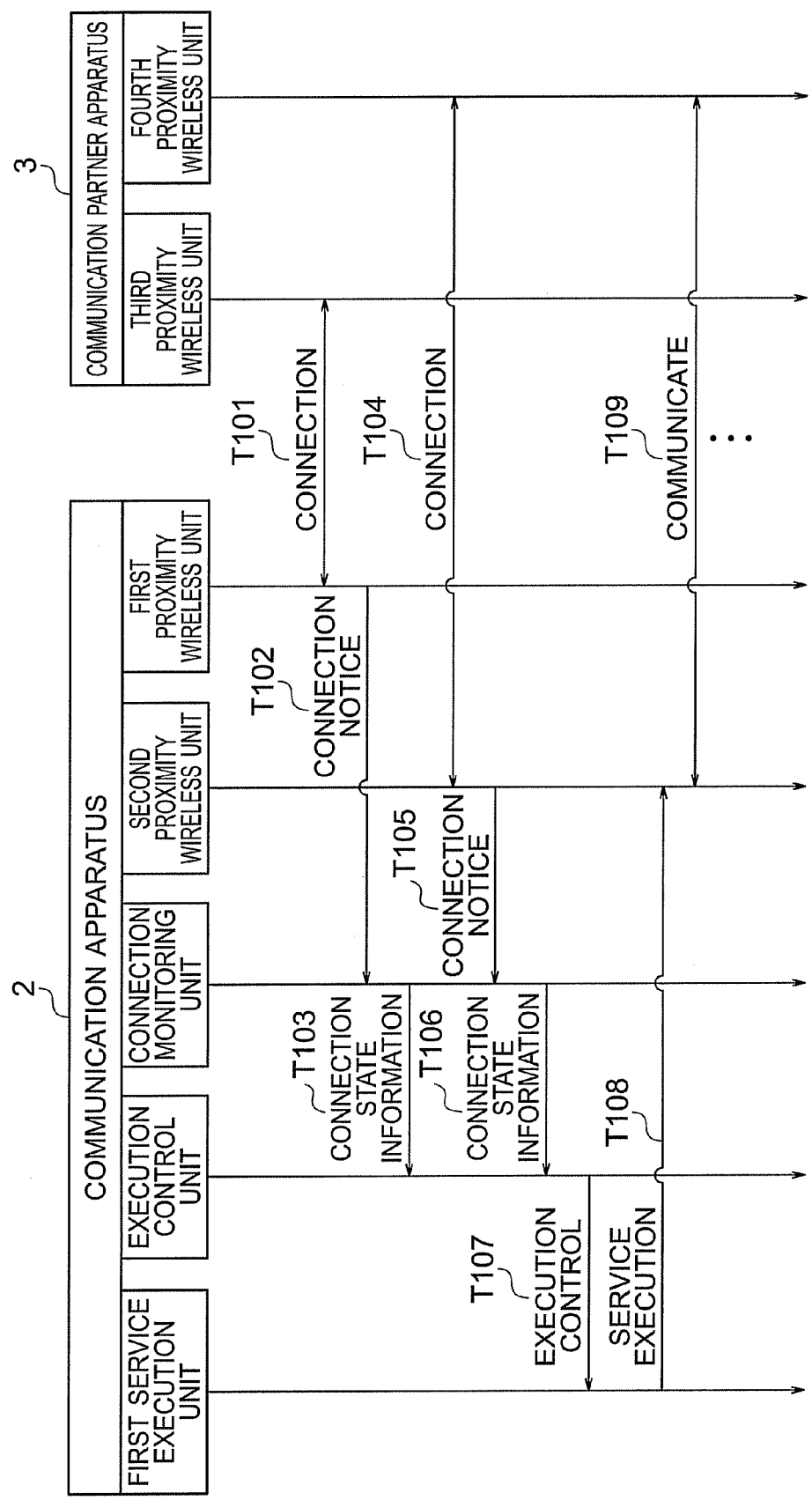
FIG. 7 is a sequence diagram illustrating one example of the procedures up to execution of the first service in the first embodiment.

FIG. 7 is a sequence diagram illustrating one example of the procedures up to execution of the first service in the first embodiment.

(T101) First, the first proximity wireless unit 231 establishes a connection with the third proximity wireless unit 33.

(T102) The first proximity wireless unit 231 then sends to the connection monitoring unit 24 a connection notice notifying establishment of the connection.

(T103) The connection monitoring unit 24 then generates connection state information including information indicating the connected wireless unit is the first proximity wireless unit 231 and information on connected time, and outputs the generated connection state information to the determination unit 251 of the execution control unit 25.

(T104) Next, the second proximity wireless unit 232 establishes a connection with the fourth proximity wireless unit 34.

(T105) The second proximity wireless unit 232 then sends to the connection monitoring unit 24 a connection notice notifying establishment of the connection.

(T106) The connection monitoring unit 24 then generates connection state information including information indicating that the connected wireless unit is the second proximity wireless unit 232 and information on connected time, and outputs the generated connection state information to the determination unit 251 of the execution control unit 25.

(T107) Next, the determination unit 251 determines whether or not the second wireless connection in the second proximity wireless unit 232 has been established in a specified time after the establishment of the first wireless connection in the first proximity wireless unit 231. In this example, the second wireless connection in the second proximity wireless unit 232 was established in a specified time after establishment of the first wireless connection in the first proximity wireless unit 231. Accordingly, the determination unit 251 outputs the determination result to the control unit 252. Upon reception of the determination result from the determination unit 251, the control unit 252 controls the first service execution unit 261 to execute the first service.

(T108) Next, the service execution unit 261 executes a first service by using the second proximity wireless unit 232.

(T109) Next, the second proximity wireless unit 232 communicates with the fourth proximity wireless unit 34 under the control of the first service execution unit 261.

Figure 8:
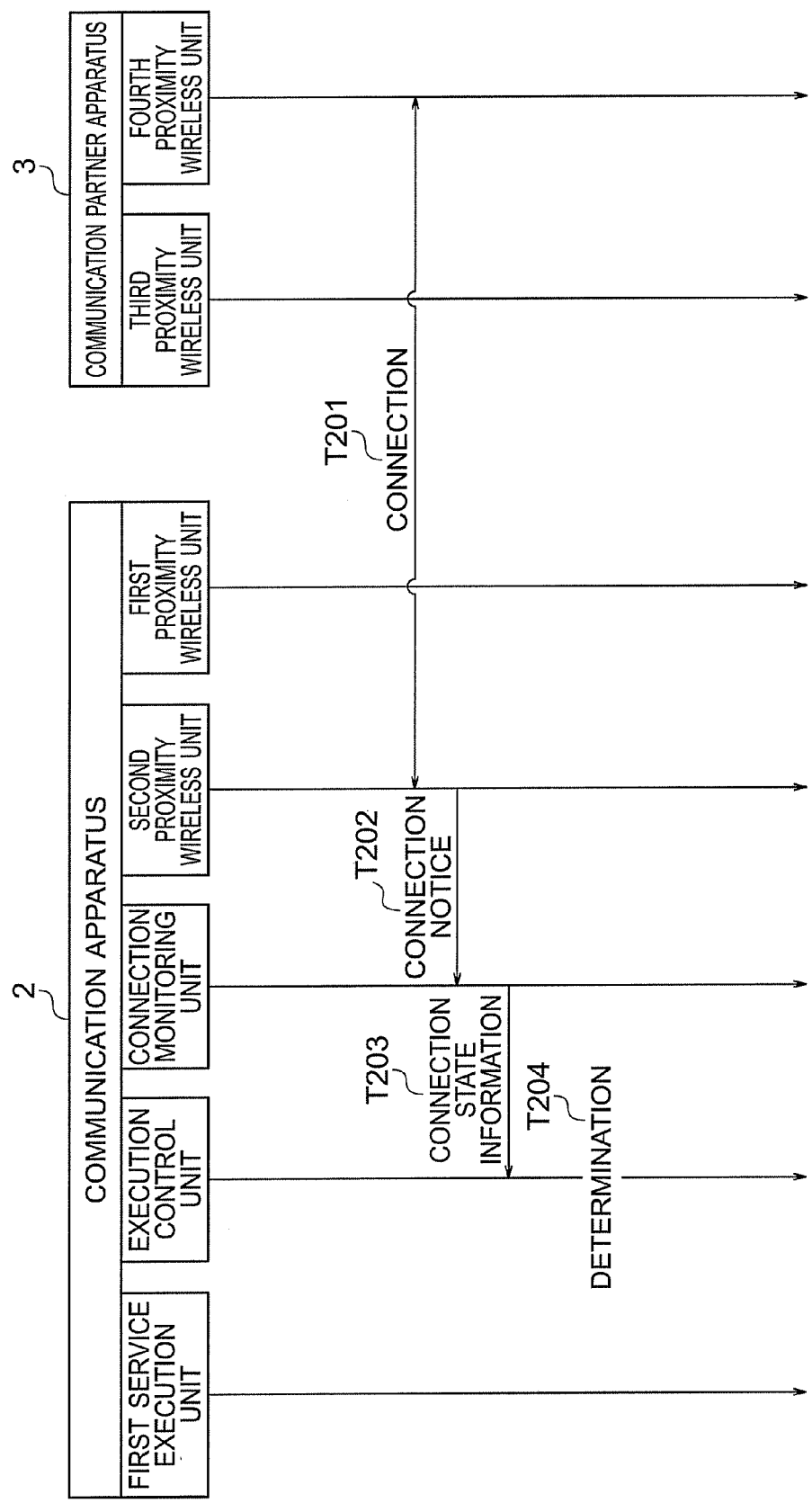
FIG. 8 is a sequence diagram illustrating a first example in the case where the first service is not executed in the first embodiment.
Figure 9:
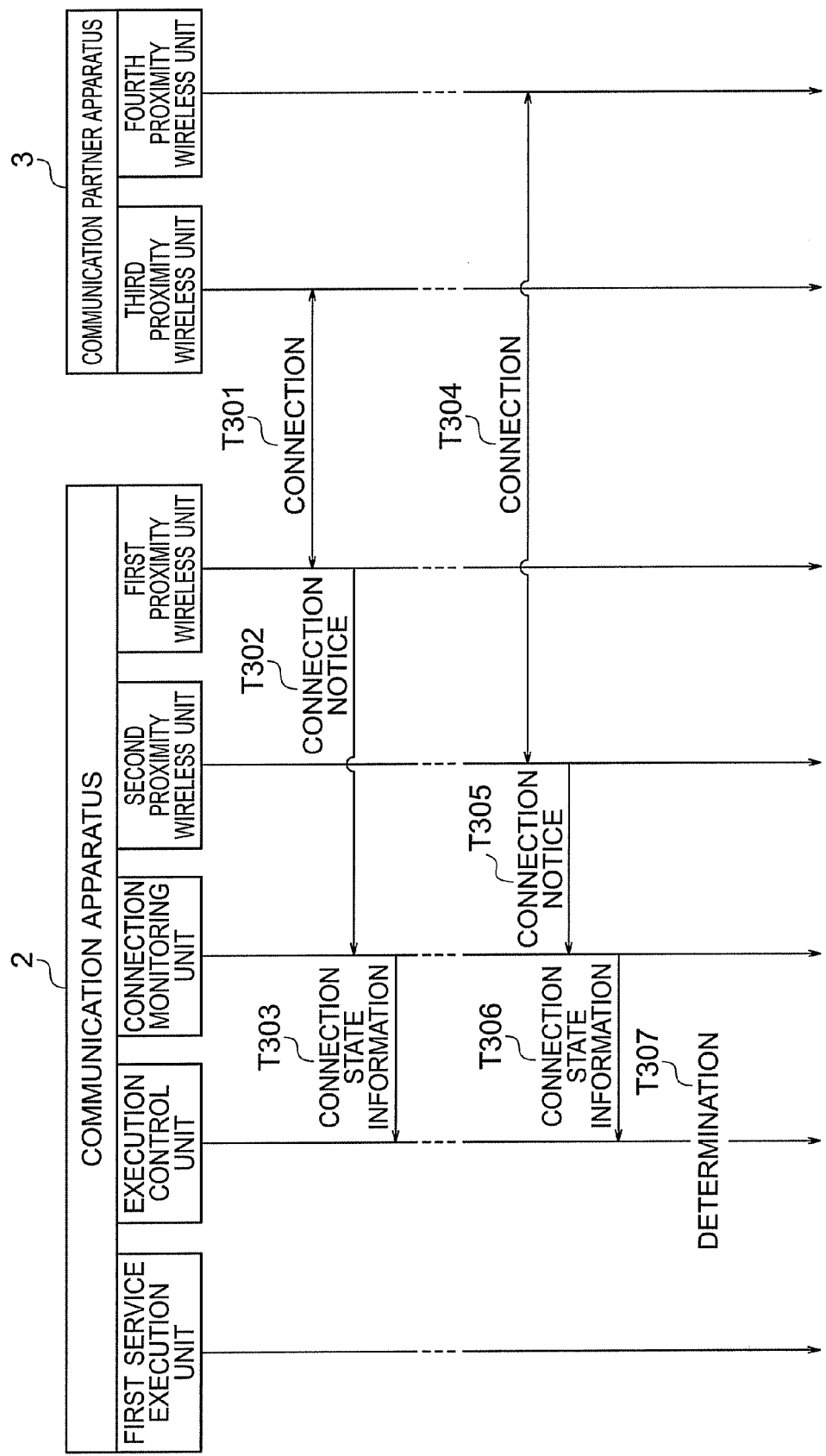
FIG. 9 is a sequence diagram illustrating a second example in the case where the first service is not executed in the first embodiment.

Next, with reference to FIGS. 8 and 9, an example in the case where the first service is not executed is described. FIG. 8 is a sequence diagram illustrating a first example in the case where the first service is not executed in the first embodiment.

(T201) First, the second proximity wireless unit 232 establishes a connection with the fourth proximity wireless unit 34.

(T202) The second proximity wireless unit 232 then sends to the connection monitoring unit 24 a connection notice notifying establishment of the connection.

(T203) The monitoring unit 24 then generates connection state information including information indicating that the second proximity wireless unit 232 is connected and information on connected time, and sends the generated connection state information to the determination unit 251 of the execution control unit 25.

(T204) Next, the determination unit 251 refers to the connection state information sent from the connection monitoring unit 24 to determine whether or not there is a connection in the first proximity wireless unit 231 within a specified time before the time of establishment of the connection in the second proximity wireless unit 232. Since there is no connection in the first proximity wireless unit 231 within a specified time before the time of the establishment of the connection in the second proximity wireless unit 232, the determination unit 251 outputs that determination result to the control unit 252. In response to the determination result, the control unit 252 does not control so that the first service execution unit 261 executes the first service.

FIG. 9 is a sequence diagram illustrating a second example in the case where the first service is not executed in the first embodiment. In this example, the first proximity wireless unit 231 is connected and a connection notice thereof is sent to the connection monitoring unit 24. Then, after a lapse of time longer than a specified time after establishment of the connection in the first proximity wireless unit 231, the second proximity wireless unit 232 is connected, and a connection notice is sent to the connection monitoring unit 24.

(T301) First, the first proximity wireless unit 231 establishes a connection with the third proximity wireless unit 33.

(T302) The first proximity wireless unit 231 then sends to the connection monitoring unit 24 a connection notice notifying establishment of the connection.

(T303) The connection monitoring unit 24 then generates connection state information including information indicating that the connected wireless unit is the first proximity wireless unit 231 and information on connected time, and outputs the generated connection state information to the determination unit 251 of the execution control unit 25.

(T304) Next, after a lapse of time longer than a specified time after T301, the second proximity wireless unit 232 establishes a connection with the fourth proximity wireless unit 34.

(T305) The second proximity wireless unit 232 then sends to the connection monitoring unit 24 a connection notice notifying establishment of the connection.

(T306) The connection monitoring unit 24 then generates connection state information including information indicating that the connected wireless unit is the second proximity wireless unit 232 and information on connected time, and outputs the generated connection state information to the determination unit 251 of the execution control unit 25.

(T307) Next, the determination unit 251 refers to the connection state information sent from the connection monitoring unit 24 to determine whether or not there is a connection in the first proximity wireless unit 231 within a specified time before establishment of the connection in the second proximity wireless unit 232. Since there is no connection in the first proximity wireless unit 231 within a specified time before the time of the establishment of the connection in the second proximity wireless unit 232, the determination unit 251 outputs the determination result to the control unit 252. In response to the determination result, the control unit 252 does not control so that the first service execution unit 261 executes the first service.

<Effects of First Embodiment>

As described in the foregoing, in the communication apparatus 2 in the first embodiment, the connection monitoring unit 24 monitors connections of wireless communication between the communication unit 23 and the communication partner apparatus 3. The determination unit 251 determines, based on the result of monitoring by the connection monitoring unit 24, whether or not the communication unit 23 has established a second wireless connection with the communication partner apparatus 3 in a specified time after the communication unit 23 established a first wireless connection with the communication partner apparatus 3. If the determination unit 251 determines that the communication unit 23 has established the second wireless connection with the communication partner apparatus 3 in a specified time after the communication unit 23 established the first wireless connection with the communication partner apparatus 3, the execution unit executes a predetermined process. On the contrary, if the determination unit 251 determines that the communication unit 23 has not established the second wireless connection with the communication partner apparatus 3 in a specified time after the communication unit 23 established the first wireless connection with the communication partner apparatus 3, the control unit 252 does not execute the predetermined process.

The communication apparatus 2 in the first embodiment executes the predetermined process only when the communication unit 23 has established a second wireless connection with a communication partner apparatus 3 in a specified time after the communication unit 23 established a first wireless connection with the same communication partner apparatus 3. Accordingly, the probability of the service being executed without the intention of the owner while the owner holds the communication apparatus 2 can be reduced.

Furthermore, only when the communication unit 23 has established a second wireless connection with a communication partner in a specified time after the communication unit 23 established a first wireless connection with the same communication partner, the communication apparatus 2 in the first embodiment communicates with the specific communication partner apparatus connected in the second wireless connection, and executes the predetermined process (for example, a settlement process). As a consequence, even when a plurality of communication partner apparatuses are placed adjacent to each other, the communication apparatus 2 can execute the predetermined process with a specific communication partner apparatus but cannot execute the predetermined process with other communication partner apparatuses. Accordingly, the probability of executing the service with communication partner apparatuses other than the desired communication partner apparatus can be reduced.

<Modification>

Figure 10:
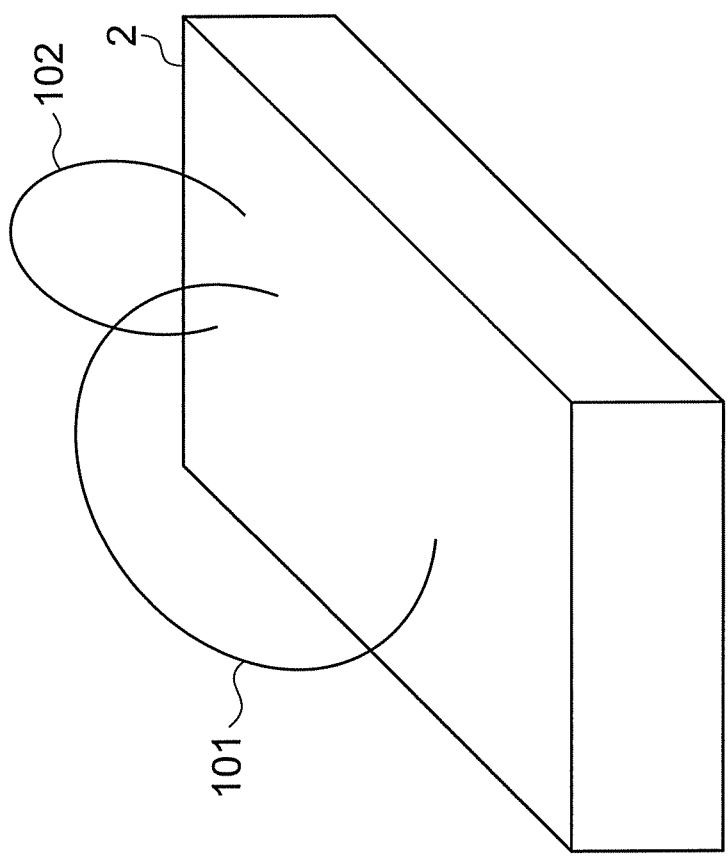
FIG. 10 illustrates a modification of the directivities of the first antenna 21 and the second antenna 22 included in the communication apparatus 2 in the first embodiment.

The first directivity 101 of the first antenna and the second directivity 102 of the second antenna may be configured as illustrated in FIG. 10. FIG. 10 illustrates a modification of the directivities of the first antenna 21 and the second antenna 22 included in the communication apparatus 2 in the first embodiment. The first directivity 101 in FIG. 10 is in a direction vertical to the principal surface of the communication apparatus 2. While the second directivity 102 in FIG. 10 is in a direction vertical to the principal surface of the communication apparatus 2, the direction thereof is different from that of the first directivity 101.

<First Example of Identifying Communication Partner>

For example, the partner control unit 35 in each of the communication partner apparatuses 3 may hold identification information for identifying the communication partner apparatuses 3. Whenever a wireless connection is established, each of the communication partner apparatuses 3 may provide the identification information to the communication apparatus 2 via the third proximity wireless unit 33 or the fourth proximity wireless unit 34. Here, the identification information may be unique information to each communication partner apparatus 3 for example. In a different perspective, whenever establishment of the wireless connection is detected, the connection monitoring unit 24 may acquire the identification information identifying respective communication partner apparatuses 3 with which the communication unit 23 established respective wireless connections, from the communication partner apparatuses.

Whenever the establishment of the wireless connection is detected, the connection monitoring unit 24 may include the acquired identification information in the connection state information and may transmit the connection state information to the execution control unit 25. Then, the execution control unit 25 may control the process execution unit 26 in accordance with, in addition to the establishment history, whether or not pieces of the identification information on the communication partner apparatuses that established respective wireless connections match each other. In a specific example, the execution control unit 25 may control the process execution unit 26 to execute the predetermined process when the above-stated condition is met and when the identification information on the communication partner apparatus 3 connected in the first wireless connection matches the identification information on the communication partner apparatus 3 in the second wireless connection.

Accordingly, even in a situation where the communication partner apparatuses are placed extremely adjacent to each other, and in this state, a connection can be established in the third proximity wireless unit 33 of a certain communication partner apparatus 3 and then in a specified time, a connection with the fourth proximity wireless unit 34 of another communication partner apparatus 3 can be made, the control unit 252 of the communication apparatus 2 can control so that the first service is not executed since their identification information pieces do not match each other.

Thus, it becomes possible to more efficiently reduce the probability of occurrence of the problem that the communication apparatus 2 executes the service with the partners other than a desired partner when a plurality of partners are placed adjacent to each other.

<Second Example of Identifying Communication Partner>

A description is given of a second example in which whether the partner connected to the first proximity wireless unit 231 is identical to the partner connected to the second proximity wireless unit 232 is confirmed. The communication unit 23 of the communication apparatus 2 wirelessly transmits first information to the communication partner apparatus 3, when the communication unit 23 established a first wireless connection with a communication partner apparatus (for example, when a wireless connection is made in the first proximity wireless unit 231). This first information is unique for each of the plurality of communication apparatuses 2. For example, the first information is unique information to the communication apparatuses 2 or random numbers.

The third proximity wireless unit 33 of the communication partner apparatus 3 receives the first information, and outputs it to the partner control unit 35. The partner control unit 35 holds the first information. When the partner control unit 35 establishes a second wireless connection with the communication apparatus 2 (for example, when a wireless connection with the communication apparatus 2 is made by the fourth proximity wireless unit 34), the partner control unit 35 makes the fourth proximity wireless unit 34 wirelessly transmit this first information to the communication apparatus 2 as second information.

In this case, from the viewpoint of the communication apparatus 2, the communication unit 23 of the communication apparatus 2 wirelessly receives the second information from this communication partner apparatus 3 when the communication apparatus 2 established the second wireless connection with the communication partner apparatus 3. The execution control unit 25 controls the process execution unit 26 in accordance with, in addition to the establishment history, whether or not the first information wirelessly transmitted by the communication unit 23 matches the second information wirelessly received by the communication unit 23.

In that case, the control unit 252 of the communication apparatus 2 determines, for example, whether or not the second information received by the second proximity wireless unit 232 matches the first information previously transmitted by the first proximity wireless unit 231. If the first information matches the second information, the control unit 252 can confirm that the partner connected to the first proximity wireless unit 231 is identical to the partner connected to the second proximity wireless unit 232. Therefore, when the first information matches the second information, the execution control unit 25 controls the process execution unit 26 based on, for example, the establishment history. Contrary to this, when the first information does not match the second information, the execution control unit 25 controls the process execution unit 26 so that the process execution unit 26 does not execute the process.

Thus, it is confirmed whether or not the communication partners are identical, and the communication partners being identical is used as a condition for executing the first service. As a result, it becomes possible to more efficiently reduce the probability of occurrence of the problem that the communication apparatus executes the service with partners other than a desired partner.

<Establishment of Three or More Connections>

For example, the execution control unit 25 may control so that the first service is executed in the first service execution unit 261 when a plurality of connection establishment patterns (three or more patterns in this one example) included in the connection state information match predetermined connection establishment patterns. Thus, the execution control unit 25 may control the process execution unit 26 in accordance with whether an order of wireless connection establishment identified from the establishment history matches a predetermined connection establishment pattern.

For example, assume that the state of establishing a wireless connection in the second proximity wireless unit 232, establishing a wireless connection in the first proximity wireless unit 231, and then establishing a wireless connection in the second proximity wireless unit 232 again is expressed as a pattern of (second, first, and second). In one example, the execution control unit 25 holds the pattern of (second, first, and second) as a predetermined connection establishment pattern.

In this case, the execution control unit 25 may control so that the first service is executed in the first service execution unit 261 if, for example, the connection pattern matches the pattern of (second, first, and second) and if the wireless connection in the second proximity wireless unit 232 is established in a specified time after establishment of the wireless connection in the first proximity wireless unit 231.

On the contrary, when the wireless connection pattern is a pattern of (first, first, and second), then the pattern does not match the predetermined connection establishment pattern. Accordingly, the execution control unit 25 may disable the first service execution unit 261 from executing the first service even if the wireless connection in the second proximity wireless unit 232 is established in a specified time after establishment of the wireless connection in the first proximity wireless unit 231.

The execution control unit 25 may control so that the first service is executed in the first service execution unit 261 if, for example, the connection pattern is (second, first, and second) and if the wireless connection in the first proximity wireless unit 231 is established in a specified time after establishment of the wireless connection in the second proximity wireless unit 232.

The execution control unit 25 may control so that the first service is executed in the first service execution unit 261 if, for example, the connection pattern is (second, first, and second) and if a time interval between establishments of the respective wireless connections is within a specified time.

The execution control unit 25 may control so that the first service is executed in the first service execution unit 261 if, for example, the connection pattern is (second, first, and second) and if a last wireless connection in the first proximity wireless unit 231 is established in a specified time after establishment of a first wireless connection in the first proximity wireless unit 231.

Thus, the execution control unit 25 may control the process execution unit 26 in accordance with whether or not a time interval between at least two times included in times of establishment of the plurality of wireless connections established in an order that matches the connection establishment pattern is within a specified time.

Thus, using a history of the plurality of establishment as a condition of executing the first service makes it possible to more efficiently reduce the probability of the service being executed without the intention of the user even though the user holds the communication apparatus 2.

Figure 11:
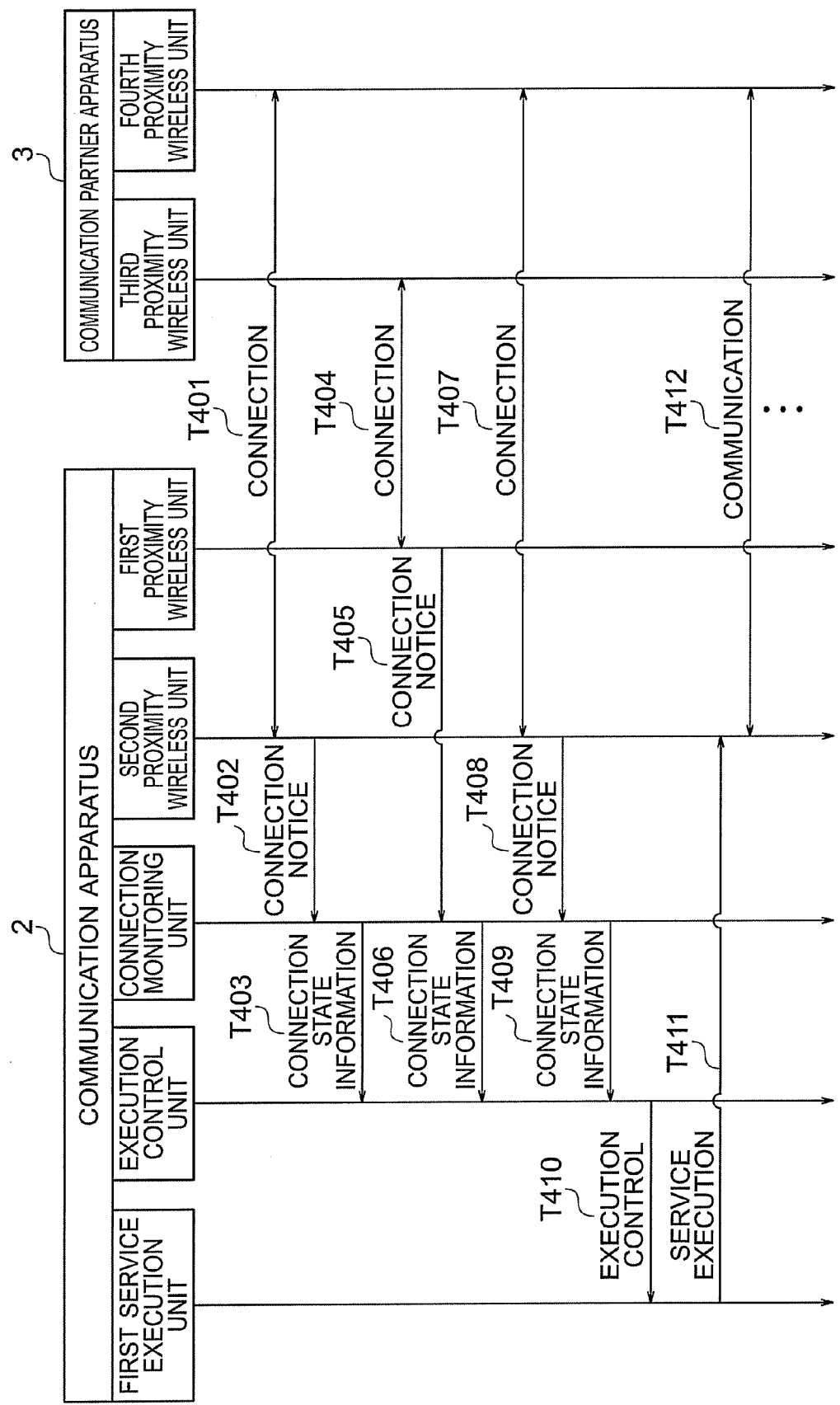
FIG. 11 is a sequence diagram illustrating an example of a process in the case where an order of three connections matches a predetermined connection order in the first embodiment.

FIG. 11 is a sequence diagram illustrating an example of a process in the case where an order of three connections matches a predetermined connection order in the first embodiment.

(T401) First, the second proximity wireless unit 232 establishes a connection with the fourth proximity wireless unit 34.

(T402) The second proximity wireless unit 232 then sends to the connection monitoring unit 24 a connection notice notifying establishment of the connection.

(T403) The connection monitoring unit 24 then generates connection state information including information indicating that the connected wireless unit is the second proximity wireless unit 232 and information on connected time, and outputs the generated connection state information to the determination unit 251 of the execution control unit 25.

(T404) Next, the first proximity wireless unit 231 establishes a connection with the third proximity wireless unit 33.

(T405) The first proximity wireless unit 231 then sends to the connection monitoring unit 24 a connection notice notifying establishment of the connection.

(T406) The connection monitoring unit 24 then generates connection state information including information indicating that the connected wireless unit is the first proximity wireless unit 231 and information on connected time, and outputs the generated connection state information to the determination unit 251 of the execution control unit 25.

(T407) Next, the second proximity wireless unit 232 establishes a connection with the fourth proximity wireless unit 34.

(T408) The second proximity wireless unit 232 then sends to the connection monitoring unit 24 a connection notice notifying establishment of the connection.

(T409) The connection monitoring unit 24 then generates connection state information including information indicating that the connected wireless unit is the second proximity wireless unit 232 and information on connected time, and outputs the generated connection state information to the determination unit 251 of the execution control unit 25.

(T410) Next, the determination unit 251 determines whether or not the second wireless connection in the second proximity wireless unit 232 was established, the first wireless connection in the first proximity wireless unit 231 was established, and then the second wireless connection in the second proximity wireless unit 232 was further established. In this one example, it is assumed that the second wireless connection in the second proximity wireless unit 232 was established, the first wireless connection in the first proximity wireless unit 231 was established, and then the second wireless connection in the second proximity wireless unit 232 was further established. The determination unit 251 outputs the determination result to the control unit 252. Upon reception of the determination result from the determination unit 251, the control unit 252 controls the first service execution unit 261 to execute the first service.

(T411) Next, the service execution unit 261 executes a first service by using the second proximity wireless unit 232.

(T412) Next, the second proximity wireless unit 232 communicates with the fourth proximity wireless unit 34 under the control of the first service execution unit 261.

A fifth proximity wireless unit may be provided in the communication apparatus 2, and a pattern including an establishment history in the fifth proximity wireless unit may be used as a condition. For example, such patterns as (fifth, first, and second) and (first, second, fifth, first, and second) may be used as a condition.

<Switching Services in Association with Patterns>

A plurality of first service execution units 261 may be provided, and the execution control unit 25 may control so that service execution conditions vary in the respective units. For example, the first service execution unit 261 may include a first A service execution unit, a first B service execution unit, and a first C service execution unit, and the control unit 252 may make the respective units execute a first A service, a first B service, and a first C service.

The execution control unit 25 may change control conditions so that services are executed in the respective service execution units. For example, the control unit 252 may control the first A service execution unit when the order of wireless connection establishment is (first, first, second), controls the first B service execution unit when the order is (first, second, first, second), and controls the first C service execution unit when the order is (second, second, first, second), so that services corresponding to the respective units are executed.

In that case, the communication apparatus 2 may further include a storage unit that stores the order of wireless connection establishment in association with process identification information that identifies processes executed by the process execution unit 26. The execution control unit 25 may refer to this storage unit to instruct the process execution unit 26 to execute the process indicated by the process identification information corresponding to the order of wireless connection establishment identified from the above-stated establishment history.

The process execution unit 26 may further include a third service execution unit similar to the first service execution unit 261 except that the functions of the first proximity wireless unit 231 and the second proximity wireless unit 232 are reversed. More specifically, the execution control unit 25 may control so that a third service using the first proximity wireless unit 231 is executed in the third service execution unit only when the connection in the first proximity wireless unit 231 is confirmed in a specified time after confirmation of the connection in the second proximity wireless unit 232 based on the connection state information. The execution control unit 25 may use the first service execution unit 261 and the third service execution unit to control so that, for example, the first service execution unit executes a corresponding service when the connection pattern is (first and second) and the third service execution unit executes a corresponding service when the connection pattern is (second and first).

In this way, the execution control unit 25 may switch the services (processes) executed by the process execution unit 26 in accordance with the order of wireless connection establishment. The services to be switched may correspond to the type of files acquired through communication. The services to be switched may also correspond to, for example, whether communication is performed to transmit or receive a file.

Figure 12:
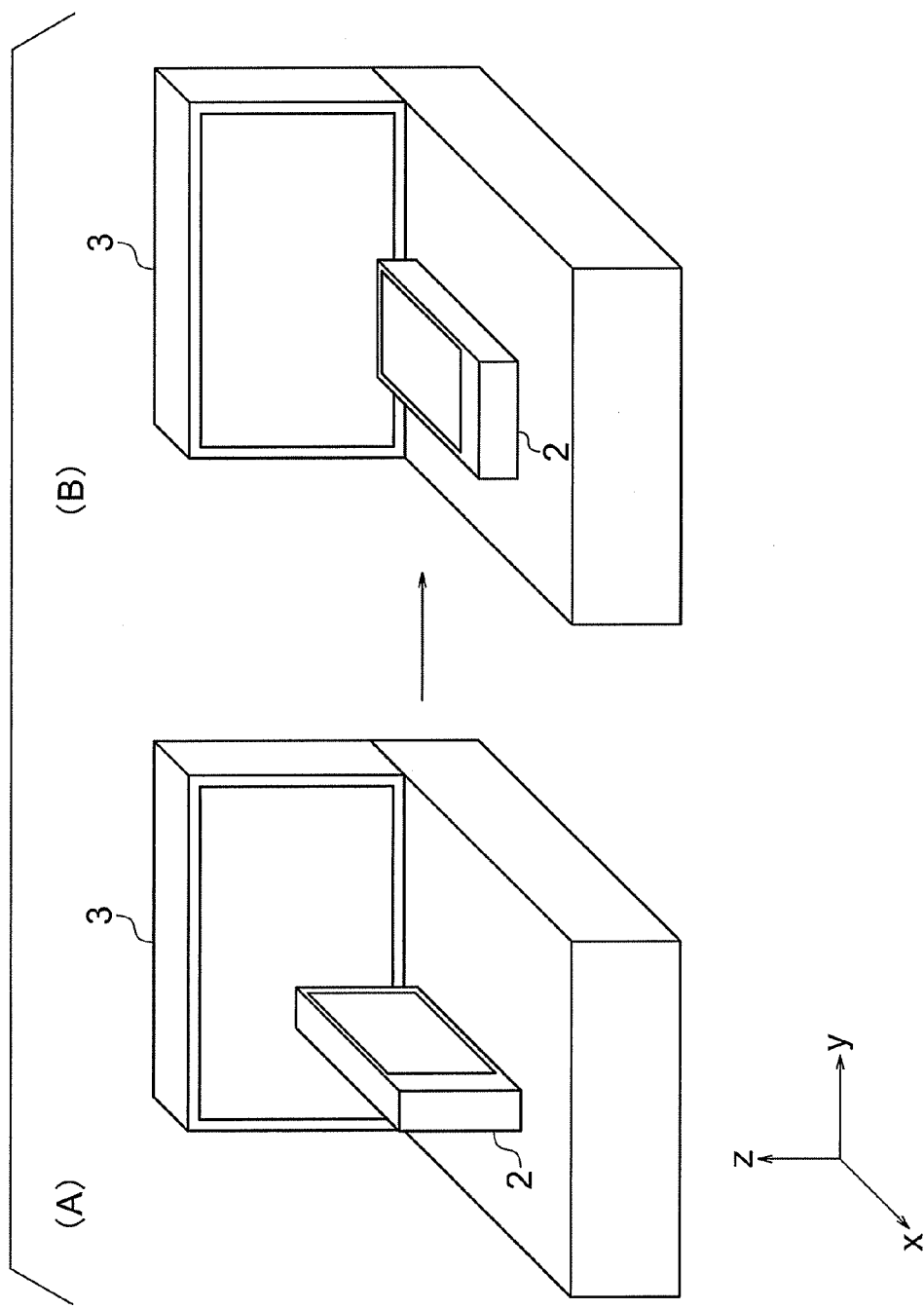
FIG. 12(A) illustrates one example of a positional relationship between the communication apparatus 2 and the communication partner apparatus 3 when the first wireless connection is established in a modification of the first embodiment.
FIG. 12(B) illustrates one example of the positional relationship between the communication apparatus 2 and the communication partner apparatus 3 when the second wireless connection is established in the modification of the first embodiment.

FIG. 12(A) illustrates one example of a positional relationship between the communication apparatus 2 and the communication partner apparatus 3 when the first wireless connection is established in a modification of the first embodiment. FIG. 12(B) illustrates one example of the positional relationship between the communication apparatus 2 and the communication partner apparatus 3 when the second wireless connection is established in the modification of the first embodiment. FIGS. 12A and 12B illustrate an example in which the communication partner apparatus 3 is a file supply terminal with a display.

For example, when a file supply terminal with a display as illustrated in FIGS. 12A and 12B is used as the communication partner apparatus 3, a file A may be supplied in the case of a certain connection pattern while a file B different from the file A may be supplied in the case of another connection pattern. When the communication partner apparatus 3 includes a storage function in FIGS. 6A and 6B, a file may be transferred from the communication apparatus 2 to the communication partner apparatus 3 in the case of a certain connection pattern, while a file may be transferred from the communication partner apparatus 3 to the communication apparatus 2 in the case of another connection pattern.

<Second Embodiment>

Hereinafter, a second embodiment will be described. In the first embodiment, the first wireless connection is different in the directivity of the antenna from the second wireless connection. In the communication apparatus 2 in the second embodiment, which is different from the first embodiment, the first wireless connection and the second wireless connection are different in a communication distance. Since the configurations of the communication system 1, the communication apparatus 2, and the communication partner apparatus 3 are identical to those in the first embodiment, a description thereof is omitted.

The directivities of the first antenna 21 and the second antenna 22 in the second embodiment are identical in one example. The first proximity wireless unit 231 can perform wireless communication in a first communication distance range, and the second proximity wireless unit 232 can perform wireless communication in a second communication distance range different from the first communication distance range. Accordingly, the wireless connection in the first short-distance wireless unit 231 and the wireless connection in the second short-distance wireless unit 232 are different from each other in a communication distance to the communication partner apparatus 3.

Figure 13:
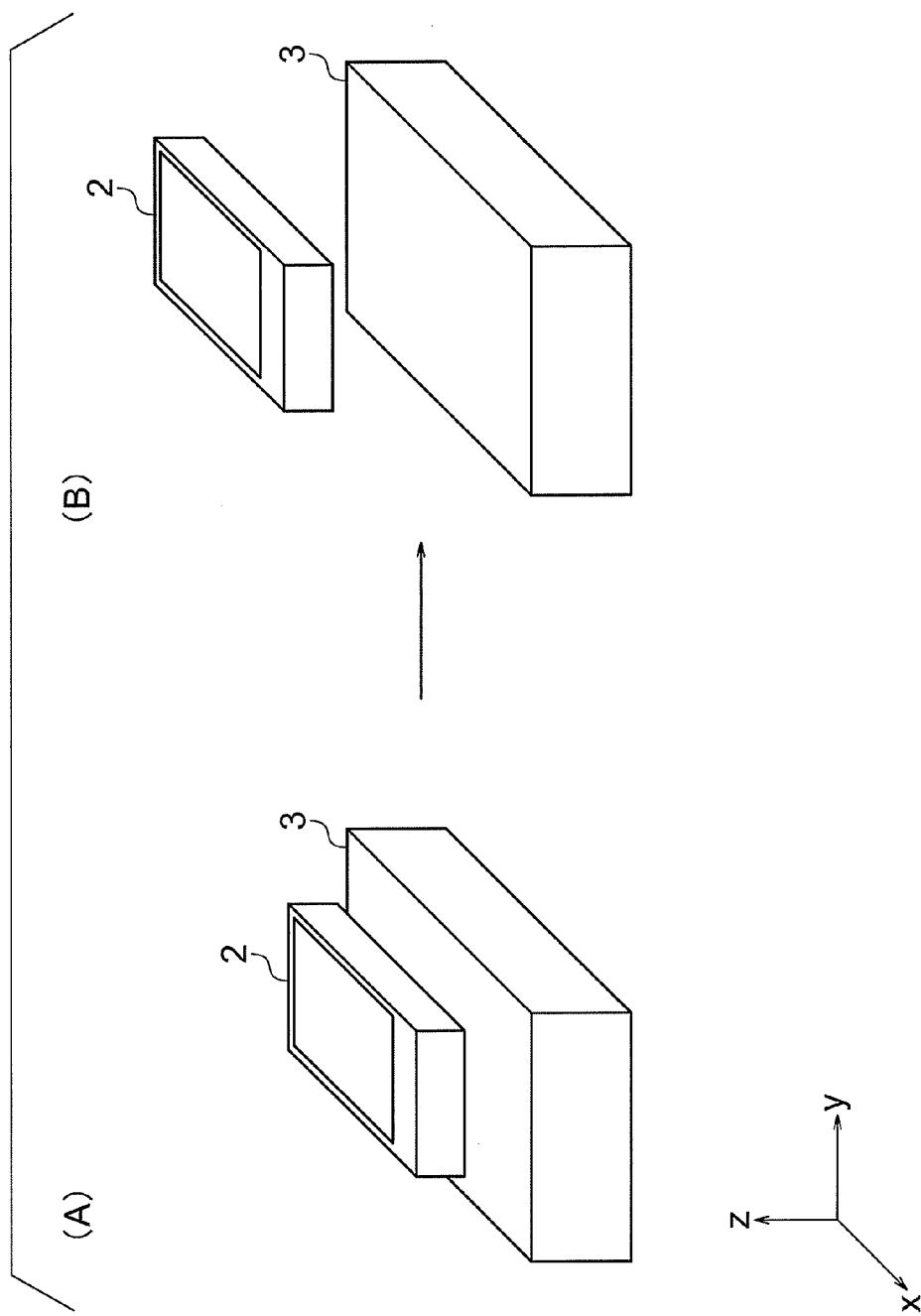
FIG. 13(A) illustrates one example of a positional relationship between the communication apparatus 2 and the communication partner apparatus 3 when a first wireless connection is established in the second embodiment.
FIG. 13(B) illustrates one example of the positional relationship between the communication apparatus 2 and the communication partner apparatus 3 when a second wireless connection is established in the second embodiment.

FIG. 13(A) illustrates one example of a positional relationship between the communication apparatus 2 and the communication partner apparatus 3 when a first wireless connection is established in the second embodiment. FIG. 13(B)

illustrates one example of the positional relationship between the communication apparatus 2 and the communication partner apparatus 3 when a second wireless connection is established in the second embodiment.

For example, assume the case where the first communication distance range is set to 3 cm or less and the second communication distance range is set to 3 cm or more and less than 10 cm. In that case, the control unit 252 controls, for example, the first service execution unit 261 so as to execute the first service when the user brings the communication apparatus 2 as close as 3 cm or less to the communication partner apparatus 3 as illustrated in FIG. 13(A) and then takes the communication apparatus 2 as far as 3 cm or more and less than 10 cm away from the communication partner apparatus 3 as illustrated in FIG. 13(B).

Such configuration makes it possible to reduce a probability that the first proximity wireless unit 231 and the second proximity wireless unit 232 are simultaneously in a communication enabled state. This makes it possible to reduce a probability that the second wireless connection in the second proximity wireless unit 232 is established in a specified time after establishment of the first wireless connection in the first proximity wireless unit 231 without the intension of the user. As a result, the probability of the service being executed without the intention of the user can be reduced as in the first embodiment.

In the second embodiment, the configuration of two antennas including the first antenna 21 and the second antenna 22 has been described as in the first embodiment. However, the communication apparatus 2 may have one antenna, and in that case, the communication unit 23 may have one proximity wireless unit. When one antenna is provided, the proximity wireless unit may change, for example, transmission power so as to differ the first wireless connection from the second wireless connection in a communication distance. In this case, the communication unit 23 has a proximity wireless unit capable of making a plurality of wireless connections via a single antenna, and the respective wireless connections in this proximity wireless unit are different from each other in a communication distance to the communication partner apparatus 3.

<Third Embodiment>

Hereinafter, a third embodiment will be described. In the first embodiment, the first wireless connection and the second wireless connection are different in the directivity of the antenna. In a communication apparatus 2 in the third embodiment, the first wireless connection and the second wireless connection are different in polarization. Since the configurations of the communication system 1, the communication apparatus 2, and the communication partner apparatus 3 are identical to those in the first embodiment, a description thereof is omitted.

In one example, while the directivities of the first antenna 21 and the second antenna 22 are identical in the third embodiment, the polarization of the first antenna 21 is different from the polarization of the second antenna 22.

A first wireless connection uses the first antenna 21, and a second wireless connection uses the second antenna 22.

The first proximity wireless unit 231 establishes a wireless connection by using the first antenna 21 having a first polarization. The second proximity wireless unit 232 establishes a wireless connection by using the second antenna having a second polarization different from the first polarization.

Figure 14:
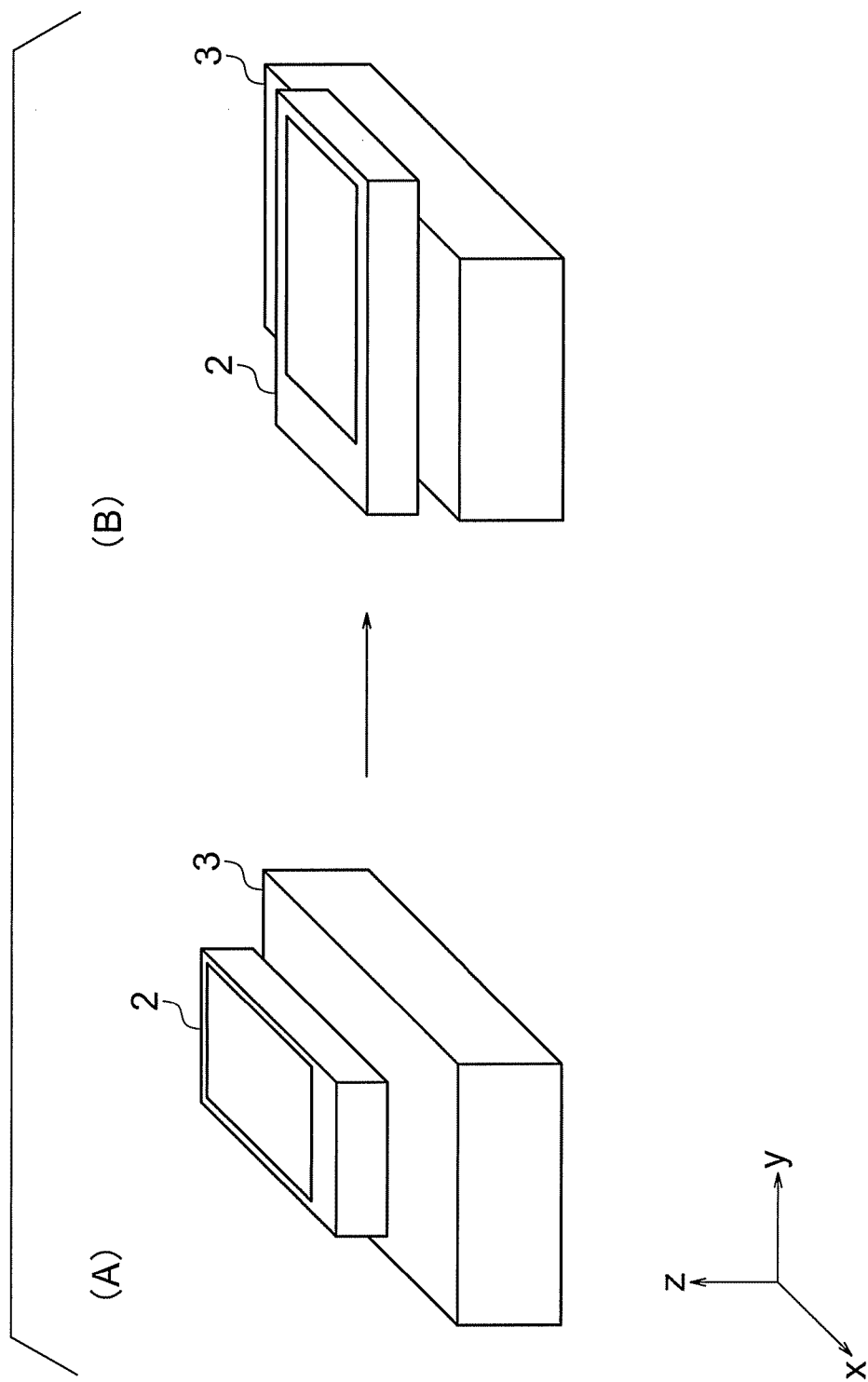
FIG. 14(A) illustrates one example of a positional relationship between the communication apparatus 2 and the communication partner apparatus 3 when a first wireless connection is established in the third embodiment.
FIG. 14(B) illustrates one example of the positional relationship between the communication apparatus 2 and the communication partner apparatus 3 when a second wireless connection is established in the third embodiment.

FIG. 14(A) illustrates one example of a positional relationship between the communication apparatus 2 and the communication partner apparatus 3 when a first wireless connection is established in the third embodiment. FIG. 14(B) illustrates one example of the positional relationship between the communication apparatus 2 and the communication partner apparatus 3 when a second wireless connection is established in the third embodiment.

For example, the first polarization is a linear polarization parallel to a long side of the communication apparatus 2, i.e., a linear polarization parallel to an x-axis, while the second polarization is a linear polarization orthogonal to the first polarization. In one example, both the third antenna 31 and the fourth antenna 32 of the communication partner apparatus 3 have linear polarizations parallel to the x-axis as in the case of the first polarization. On this premise, when the user brings the communication apparatus 2 close to the communication partner apparatus 3 with an attitude as illustrated in FIG. 14(A), and then rotates the communication apparatus 2 about 90 degrees clockwise or counterclockwise as illustrated in FIG. 14(B), the control unit 252 controls, for example, the first service execution unit 261 so as to execute the first service.

Such configuration makes it possible to reduce a probability that the first proximity wireless unit 231 and the second proximity wireless unit 232 are simultaneously in a communication enabled state. This makes it possible to reduce a probability that the second wireless connection in the second proximity wireless unit 232 is established in a specified time after establishment of the first wireless connection in the first proximity wireless unit 231 without the intension of the user. As a result, the probability of the service being executed without the intention of the user can be reduced as in the first embodiment.

<Fourth Embodiment>

Hereinafter, a forth embodiment will be described. In the first embodiment, the first wireless connection and the second wireless connection are different in the directivity of the antenna. In contrast, a communication apparatus 2 in the fourth embodiment is different from that in the first embodiment in the point that the first wireless connection and the second wireless connection are different from each other in a time (hereinafter also referred to as a connection establishment time) taken from the start of the wireless connection to the completion of the wireless connection establishment. In other words, the first proximity wireless unit 231 and the second proximity wireless unit 232 are different from each other in a time required from the start of the wireless connection to the completion of the wireless connection establishment. Since the configurations of the communication system 1, the communication apparatus 2, and the communication partner apparatus 3 are identical to those in the first embodiment, a description thereof is omitted.

The first proximity wireless unit 231 requires a first connection establishment time from the start of the wireless connection to the completion of the wireless connection establishment. The second proximity wireless unit 232 requires a second connection establishment time from the start of wireless connection to the completion of the wireless connection establishment, which is shorter than the first connection establishment time. For example, the first proximity wireless unit 231 executes wireless connection by TransferJet. For example, the second proximity wireless unit 232 executes wireless connection by NFC.

FIG. 15 illustrates a first example of time variations in communication states of the first proximity wireless unit 231 and the second proximity wireless unit 232 in the fourth embodiment. An abscissa represents time "t." Time "t"=0 represents a start time of the wireless connection. FIG. 15 illustrates communication states including a standby state, a connection trial state in which establishment of a wireless connection is tried, a connection state in which the wireless connection is established, and an execution state in which communication is being executed. Here, the time required from the start of the wireless connection to the completion of the wireless connection establishment is a sum of a duration of the standby state and a duration of the connection trial state.

In one example, the execution control unit 25 makes the process execution unit 26 execute a first service using communication in the second proximity wireless unit 232 if the wireless connection in the first proximity wireless unit 231 is established and the wireless connection in the second proximity wireless unit 232 is established.

As illustrated in FIG. 15, since the duration of the connection trial state (connection trial time) is longer in the first proximity wireless unit 231 than in the second proximity wireless unit 232, the time from the start of trial of wireless connection establishment to the completion of the wireless connection establishment is longer in the first proximity wireless unit 231 than in the second proximity wireless unit 232.

Accordingly, even when the second proximity wireless unit 232 establishes the wireless connection, the execution control unit 25 stands by until the wireless connection in the first proximity wireless unit 231 is established. When the wireless connection establishment by the first proximity wireless unit 231 is detected, the execution control unit 26 makes the process execution unit 25 execute the first service using communication in the second proximity wireless unit 232.

As a consequence, even if the wireless connection of the second proximity wireless unit 232 is accidentally established, the first service is not executed unless the wireless connection in the first proximity wireless unit 231 is established thereafter. This makes it possible to reduce the probability of the service being executed without the intention of the user.

FIG. 16 illustrates a second example of time variations in communication states of the first proximity wireless unit 231 and the second proximity wireless unit 232 in the fourth embodiment. An abscissa represents time "t". Time "t"=0 represents a start time of the wireless connection. FIG. 16 illustrates communication states including a standby state, a connection trial state in which a connection is tried, a connection state in which the connection is established, and an execution state in which communication is being executed.

As illustrated in FIG. 16, in the second example, a condition on which the second proximity wireless unit 232 starts to try wireless connection establishment is establishment of the connection in the first proximity wireless unit 231. In the example of FIG. 16, the second proximity wireless unit 232 starts trial of wireless connection establishment when, for example, completion of wireless connection establishment by the first proximity wireless unit 231 is detected.

In this configuration, the second proximity wireless unit 232 starts establishment of a connection only after the connection of the first proximity wireless unit 231 is established. The control unit 252 makes the first service execution unit 261 execute the first service only after the connection in the second proximity wireless unit 232 is established. As a consequence, even if the first proximity wireless unit 231 is accidentally in a connection state, the first service is not executed unless the connection in the second proximity wireless unit 232 is established thereafter. Accordingly, it becomes possible to reduce the probability of the service being executed without the intention of the user even in the case where the connection establishment time in the second proximity wireless unit 232 is not shorter than the connection establishment time in the first proximity wireless unit 231.

In the respective embodiments, the first wireless connection and the second wireless connection are configured to have different connection modes in wireless connection. However, the respective embodiments are not limited to this configuration. The first wireless connection and the second wireless connection may be identical in the connection mode in wireless connection, and a state of no connection with the communication partner apparatus 3 may be present between the first wireless connection and the second wireless connection. Here, being identical in the connection mode in wireless connection refers to the state where, for example, the antennas for use in wireless connection are identical, and all the parameters, including the directivity of the antenna, the antenna polarization, the communication distance range, and the time from the start of a wireless connection to the completion of wireless connection establishment, are identical.

In this case, if the state of no connection with the communication partner apparatus 3 is included in between the two wireless connections identical to each other in the connection mode in wireless connection, the connection monitoring unit 24 may detect that the wireless connections identical to each other in the connection mode in wireless connection are successively established.

The above-stated predetermined connection establishment pattern includes an order of successive establishment of wireless connections identical to each other in the connection mode in wireless connection. The execution control unit 25 may control the process execution unit 26 in accordance with whether an order of wireless connection establishment identified from the establishment history matches the predetermined connection establishment pattern.

In a specific example, the execution control unit 25 may make the process execution unit 26 execute the predetermined process when a first wireless connection is established in the first proximity wireless unit 231, the first wireless connection is then canceled, and then a first wireless connection is newly established in the first proximity wireless unit 231 in a specified time after the first establishment of the first wireless connection.

In each of the embodiments, the communication apparatus 2 includes the process execution unit 26. However, the each of the embodiments is not limited to this configuration. The process execution unit 26 may be included in an apparatus outside the communication apparatus 2.

The above-stated various processes relating to the communication apparatus 2 and the communication partner apparatus 3 may be executed by recording a program, which is adapted to execute each process of the communication apparatus 2 and the communication partner apparatus 3 in each of the embodiments, on a computer-readable recording medium, and causing a computer system to read and execute the program stored in the recording medium.

The "computer system" used herein may refer to a system including hardware, such as an OS and peripheral devices. In the case where a WWW system is used, the "computer system" includes a homepage provision environment (or a display environment). Moreover, the "computer-readable recording medium" refers to: a writable nonvolatile memory such as a flexible disk, a magneto-optical disk, a ROM, and a flash memory; a portable medium such as a CD-ROM; and a memory device such as a hard disk built in the computer system.

Furthermore, the "computer-readable recording medium" includes media that hold a program for a definite period of time like a volatile memory (for example, a dynamic random access memory (DRAM)) inside the computer system used as a server or a client when the program is transmitted via a network such as the Internet and/or a communication line such as a telephone line. The program may be transferred from the computer system, which stores the program in its storage device and the like, to another computer system via a transfer medium or via a transmitted wave in the transfer medium. The "transfer medium" that transfers the program herein refers to a medium having a function of transferring information, such as a network (communication network) including the Internet and a communication line such as a telephone line. The program may also be adapted to implement a part of the above-stated function. Furthermore, the program may be so-called a differential file (differential program) which can implement the above-stated function in combination with a program already recorded on the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication apparatus comprising a hardware computing system, the hardware computing system is configured to control the communication apparatus to perform operations, comprising:
   establishing at least one wireless connection with a communication partner apparatus;
   detecting establishment of the wireless connection;
   identifying an establishment history representing an order of the establishment of the wireless connection based on the detected wireless connection; and
   controlling a process execution unit in accordance with whether the order of the establishment of the wireless connection matches a predetermined pattern, the process execution unit executing at least one process.

2. The communication apparatus according to claim 1, wherein
   the hardware computing system controls the communication apparatus to control the process execution unit in accordance with whether or not a time interval between at least two times included in times of the establishment of the wireless connections established in an order matched with the predetermined pattern is within a specified time.

3. The communication apparatus according to claim 1, wherein
   the predetermined pattern includes an order of successive establishment of the wireless connections which are different from each other.

4. The communication apparatus according to claim 1, wherein
   the hardware computing system controls the communication apparatus to refer to a storage unit that stores the order of the establishment of the wireless connection in association with process identification information that identifies processes executed by the process execution unit, and controls the process execution unit to execute a process corresponding to the order of the establishment of the wireless connection identified from the establishment history.

5. The communication apparatus according to claim 1, comprising:
   a first antenna; and
   a second antenna, wherein
   the hardware computing system controls the communication apparatus to establish one wireless connection among the plurality of wireless connections, via the first antenna; and establish another wireless connection among the plurality of wireless connections, via the second antenna.

6. The communication apparatus according to claim 5, wherein
   the first antenna has a directivity different from that of the second antenna.

7. The communication apparatus according to claim 6, wherein
   the directivities of the first and second antennas are in directions of different surfaces of a casing that houses the communication apparatus.

8. The communication apparatus according to claim 5, wherein
   the first antenna is different in polarization from the second antenna.

9. The communication apparatus according to claim 5, wherein
   from start of the one wireless connection to completion of wireless connection establishment thereof is a time period that is different from a period of time from start of the other wireless connection to completion of wireless connection establishment thereof.

10. The communication apparatus according to claim 5, wherein
    the one wireless connection and the other wireless connection are different from each other in a communication distance to the communication partner apparatus.

11. The communication apparatus according to claim 1, wherein
    the hardware computing system controls the communication apparatus to make a plurality of wireless connections via a single antenna, and
    wherein the respective wireless connections are different from each other in a communication distance to the communication partner apparatus.

12. The communication apparatus according to claim 1, wherein
    the predetermined pattern includes an order of successive establishment of the wireless connections that are identical to each other in a connection mode, and
    when a state of no connection with the communication partner apparatus is included in between two wireless connections identical to each other in a connection mode, the hardware computing system controls the communication apparatus to detect that the wireless connections identical to each other in the connection mode have successively been established.

13. The communication apparatus according to claim 1, wherein
    whenever establishment of the wireless connection is detected, the hardware computing system controls the communication apparatus to acquire identification information identifying respective communication partner apparatuses with which the communication apparatus established respective wireless connections, from the communication partner apparatuses, and
    the hardware computing system controls the communication apparatus to control the process execution unit in accordance with, in addition to the establishment history, whether pieces of the identification information on the communication partner apparatuses that established the respective wireless connections match each other.

14. The communication apparatus according to claim 1, wherein
the hardware computing system controls the communication apparatus to wirelessly transmit first information to the communication partner apparatus when a first wireless connection is established with the communication partner apparatus, and receive second information from the communication partner apparatus when a second wireless connection is established with the communication partner apparatus, and
wherein the hardware computing system controls the communication apparatus to control the process execution unit in accordance with, in addition to the establishment history, whether or not the first information matches the wirelessly received second information.

15. The communication apparatus according to claim 1, wherein
the hardware computing system controls the communication apparatus to adopt a wireless scheme using a coupler or a wireless scheme using a millimeter wave.

16. The communication apparatus according to claim 1, wherein
the process executed by the process execution unit includes a process using wireless communication performed by the communication apparatus that established the wireless connection.

17. A processing method executed by a communication apparatus configured to establish a plurality of wireless connections with a communication partner apparatus, the method comprising:
detecting establishment of the wireless connections;
identifying an establishment history representing an order of the establishment of the wireless connections based on the detected wireless connection; and
controlling a process execution unit in accordance with whether the order of the establishment of the wireless connection matches a predetermined pattern, the process execution unit executing at least one process.

18. A non-transitory computer-readable recording medium storing a program that causes a communication apparatus configured to establish at least one wireless connection with a communication partner apparatus, to execute:
detecting establishment of the wireless connections;
identifying an establishment history representing an order of establishment of the wireless connection based on the detected wireless connection; and
controlling a process execution unit in accordance with whether the order of the establishment of the wireless connection matches a predetermined pattern, the process executing unit executing at least one process.

* * * * *